(12) United States Patent
Takenouchi

(10) Patent No.: US 8,374,198 B2
(45) Date of Patent: Feb. 12, 2013

(54) COMMUNICATION RELAY SYSTEM

(75) Inventor: Takao Takenouchi, Tokyo (JP)

(73) Assignee: NEC Corporation, Tokyo (JP)

( * ) Notice: Subject to any disclaimer, the term of this patent is extended or adjusted under 35 U.S.C. 154(b) by 380 days.

(21) Appl. No.: 12/706,759

(22) Filed: Feb. 17, 2010

(65) Prior Publication Data

US 2011/0051736 A1  Mar. 3, 2011

(30) Foreign Application Priority Data

Sep. 3, 2009  (JP) ................................. 2009-203570

(51) Int. Cl.
*H04J 3/16* (2006.01)
(52) U.S. Cl. ......... 370/466; 370/465; 709/227; 709/230
(58) Field of Classification Search ........................ None
See application file for complete search history.

(56) References Cited

U.S. PATENT DOCUMENTS

| 7,272,148 | B2 * | 9/2007 | Zhang et al. | 370/401 |
|---|---|---|---|---|
| 2004/0001509 | A1 * | 1/2004 | Zhang et al. | 370/466 |
| 2004/0264449 | A1 * | 12/2004 | Klaghofer et al. | 370/389 |
| 2009/0135842 | A1 * | 5/2009 | Zhu | 370/401 |
| 2009/0268734 | A1 * | 10/2009 | Wang et al. | 370/392 |
| 2009/0304025 | A1 * | 12/2009 | Boucadair et al. | 370/466 |
| 2010/0046401 | A1 * | 2/2010 | Wright et al. | 370/260 |

OTHER PUBLICATIONS

T. Takenouchi et al., "Proposal of Pseudonym Provisioning Management Function". Proceedings of the IEICE General Conference 2008, the Institute of Electronics, Information and Communication Engineers, Mar. 2008, B-7-38.

T. Takenouchi et al., "Implementation of Layered Pseudonym Management for Pseudonymous Communication," Proceedings of the IEICE General Conference 2009, the Institute of Electronics, Information and Communication Engineers, Mar. 2009, B-7-35 (with English translation) (8 pages).

* cited by examiner

*Primary Examiner* — Michael J Moore, Jr.

(57) ABSTRACT

A communication relay system relays communications between communication terminals performing the communications according to a plurality of communication protocols. The communication relay system includes pseudonymous identification information acquiring sections associated with respective communication protocols. Each of the pseudonymous identification information acquiring sections acquires pseudonymous identification information which is information according to the associated communication protocol and is different from terminal identification information for identifying each of the communication terminals. The communication relay system includes a communication relay section which, when receiving communication information according to a communication protocol from one of the communication terminals, replaces the source terminal identification information included in the communication information with pseudonymous identification information acquired by the pseudonymous identification information acquiring section, and transmits the communication information after the replacement to another one of the communication terminals.

24 Claims, 22 Drawing Sheets

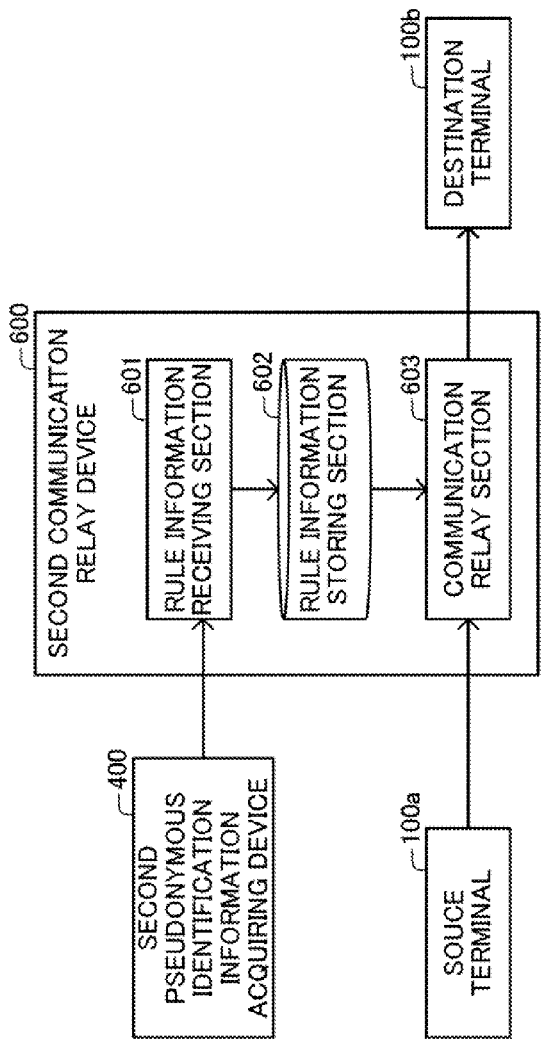

Fig.10

| SOURCE TERMINAL IDENTIFICATION INFORMATION | PSEUDONYMOUS IDENTIFICATION INFORMATION | GENERATION DATE/ TIME INFORMATION |
|---|---|---|
| sip:alice@nec.com | sip:vid888@nec.com | 2009/05/19 11:33:44 |
| sip:alice@nec.com | sip:vid999@nec.com | 2009/05/19 11:44:55 |
| ... | ... | ... |

Fig.11

| USER IDENTIFICATION INFORMATION | TERMINAL IDENTIFICATION INFORMATION |
|---|---|
| Alice | 192.168.1.1 |
| Bob | 192.168.2.2 |
| ... | ... |

Fig.12

| SOURCE TERMINAL IDENTIFICATION INFORMATION | PSEUDONYMOUS IDENTIFICATION INFORMATION | GENERATION DATE/TIME INFORMATION |
|---|---|---|
| 192.168.1.1 | 192.168.10.88 | 2009/05/19 11:33:44 |
| 192.168.1.1 | 192.168.10.99 | 2009/05/19 11:44:55 |
| ... | ... | ... |

Fig.13

| SOURCE TERMINAL IDENTIFICATION INFORMATION | DESTINATION TERMINAL IDENTIFICATION INFORMATION | PSEUDONYMOUS IDENTIFICATION INFORMATION |
|---|---|---|
| sip:alice@nec.com 192.168.1.1 | sip:bob@nec.com 192.168.2.2 | sip:vid999@nec.com 192.168.10.99 |
| ... | ... | ... |

Fig.14

| SOURCE TERMINAL IDENTIFICATION INFORMATION | DESTINATION TERMINAL IDENTIFICATION INFORMATION | PSEUDONYMOUS IDENTIFICATION INFORMATION |
|---|---|---|
| 192.168.1.1 | 192.168.2.2 | 192.168.10.99 |
| ... | ... | ... |

# COMMUNICATION RELAY SYSTEM

INCORPORATION BY REFERENCE

This application is based upon and claims the benefit of priority from Japanese patent application No. 2009-203570, filed on Sep. 3, 2009, the disclosure of which is incorporated herein in its entirety by reference.

TECHNICAL FIELD

The present invention relates to a communication relay system for relaying communications performed between a plurality of communication terminals according to a plurality of communication protocols.

BACKGROUND ART

Communication relay systems for relaying communications performed between communication terminals according to a plurality of communication protocols have been known. As an example of this kind of communication relay systems, a communication relay system disclosed in "Proposal of Pseudonym Provisioning Management Function" by Takao Takenouchi and four others, Proceedings of the IEICE General Conference 2008 (Non-Patent Document 1) includes a pseudonymous identification information acquiring unit and a communication relay unit.

The pseudonymous identification information acquiring unit acquires, for each of the communication protocols, pseudonymous identification information which is different from source terminal identification information included in communication information transmitted in accordance with each communication protocol and used for identifying a communication terminal serving as the source of the communication information, while associating the pseudonymous identification information with the source terminal identification information.

The communication relay unit is adapted such that for each of the communication protocols, when receiving communication information according to each of the communication protocols from a source terminal among a plurality of communication terminals, the communication relay unit replaces the source terminal identification information included in the received communication information with pseudonymous identification information acquired in association with the source terminal identification information. Further, the communication relay unit transmits the communication information after the replacement to a destination terminal among the communication terminals.

According to this communication relay system, it is possible to prevent information for identifying the source terminal which transmitted the communication information from being included in the communication information received by the destination terminal. In other words, communication information can be transmitted from the source terminal to the destination terminal while preventing the source terminal from being identified.

[Non-Patent Document 1] Takao Takenouchi and four others, "Proposal of Pseudonym Provisioning Management Function", Proceedings of the IEICE General Conference 2008, the Institute of Electronics, information and Communication Engineers, March 2008, B-7-38

However, in the above-described communication relay system, if a new communication protocol is added, it is necessary to alter the pseudonymous identification information acquiring unit. This means that the communication relay system involves a problem of low scalability with respect to addition of communication protocols.

Further, in the communication relay system, maintenance of a unit for acquiring pseudonymous identification information cannot be performed independently for each of the communication protocols. This means that the communication relay system also involves a problem that maintenance of the unit for acquiring pseudonymous identification information cannot be performed easily.

SUMMARY

In view of the above, an exemplary object of the invention is to provide a communication relay system capable of solving the above-described problems of "low scalability with respect to addition of communication protocols and uneasiness in maintenance".

In order to achieve the object, a communication relay system according to an aspect of the present invention is a system for relaying communications performed between a plurality of communication terminals according to a plurality of communication protocols.

The communication relay system includes at least one pseudonymous identification information acquiring unit associated with each of the plurality of communication protocols. The pseudonymous identification information acquiring unit acquires pseudonymous identification information which is information according to the communication protocol associated with the pseudonymous identification information acquiring unit and is different from terminal identification information for identifying each of the communication terminals. The communication relay system further includes a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as the source of the communication information, with the pseudonymous identification information acquired by the pseudonymous identification information acquiring unit, and transmits the communication information after the replacement to a destination terminal which is another one of the communication terminals.

Further, a communication relay method, according to another exemplary aspect of the present invention, is a method to be applied to a communication relay system which is adapted to relay communications performed between a plurality of communication terminals according to a plurality of communication protocols, and includes at least one pseudonymous identification information acquiring unit associated with each of the plurality of communication protocols. The method includes acquiring, by the pseudonymous identification information acquiring unit, pseudonymous identification information which is information according to the communication protocol associated with the pseudonymous identification information acquiring unit and is different from terminal identification information for identifying each of the communication terminals; and when receiving communication information according to at least one of the plurality of communication protocols from a source terminal which is one of the communication terminals, replacing source terminal identification information which is included in the communication information and is the terminal identification information for identifying the source terminal as the communication terminal serving as the source of the communication information, with the pseudonymous identification information acquired by the pseudonymous identification information acquiring unit, and transmitting the communication information after the replacement to a destination terminal which is another one of the communication terminals.

Further, a communication system, according to another exemplary aspect of the present invention, includes a plurality of communication terminals which perform communications according to a plurality of communication protocols; and a communication relay system for relaying the communications between the communication terminals.

A source terminal, which is one of the communication terminals, is adapted to transmit communication information, which is communication information according to at least one of the communication protocols and includes source terminal identification information which is terminal identification information for identifying the source terminal as one of the communication terminals serving as the source of the communication information, and destination terminal identification information which is terminal identification information for identifying a destination terminal as another one of the communication terminals serving as the destination of the communication information.

The communication relay system includes at least one pseudonymous identification information acquiring unit associated with each of the plurality of communication protocols. The pseudonymous identification information acquiring unit acquires pseudonymous identification information which is information according to the communication protocol associated with the pseudonymous identification information acquiring unit and is different from terminal identification information for identifying each of the communication terminals.

The communication relay system further includes a communication relay unit which, when receiving the communication information from the source terminal, replaces source terminal identification information which is included in the communication information and is the terminal identification information for identifying the source terminal as the communication terminal serving as the source of the communication information, with the pseudonymous identification information acquired by the pseudonymous identification information acquiring unit, and transmits the communication information after the replacement to the destination terminal.

Further, a pseudonymous identification information acquiring device, according to another exemplary aspect of the present invention, includes a pseudonymous identification information acquiring unit which acquires pseudonymous identification information which is information according to a predetermined communication protocol and is different from terminal identification information for identifying a communication terminal.

Further, a computer program product, according to another exemplary aspect of the present invention, is a program for causing an information processor to realize a pseudonymous identification information acquiring unit which acquires pseudonymous identification information which is information according to a predetermined communication protocol and is different from terminal identification information for identifying the communication terminals.

Further, a communication relay device, according to another exemplary aspect of the present invention, is a device adapted to relay communications performed between a plurality of communication terminals according to a plurality of communication protocols.

The communication relay device includes a pseudonymous identification information receiving unit which receives pseudonymous identification information which is information according to each of the communication protocols and is different from terminal identification information for identifying each of the communication terminals; and a communication relay unit which, when receiving communication information according to at least one of the communication protocols from a source terminal which is one of the communication terminals, replaces source terminal identification information which is included in the communication information and is the terminal identification information for identifying the source terminal as the communication terminal serving as the source of the communication information, with the received pseudonymous identification information, and transmits the communication information after the replacement to a destination terminal which is another one of the communication terminals.

Further, a computer program product, according to another exemplary aspect of the present invention, is a program for causing an information processor, adapted to relay communications performed between a plurality of communication terminals according to a plurality of communication protocols, to realize a pseudonymous identification information receiving unit which receives pseudonymous identification information which is information according to each of the communication protocols and is different from terminal identification information for identifying the communication terminals; and a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as the source of the communication information, with the received pseudonymous identification information, and transmits the communication information after the replacement to a destination terminal which is another one of the communication terminals.

With these configurations, the present invention enables to improve scalability with respect to addition of communication protocols and easiness in maintenance.

BRIEF DESCRIPTION OF THE DRAWINGS

FIG. 8 is a block diagram showing the functional overview of a second communication relay device according to the first exemplary embodiment of the present invention;

FIG. 9 shows a table containing user identification information, and terminal identification information according to a first communication protocol, stored in the first pseudonymous identification information acquiring device according to the first exemplary embodiment of the present invention;

FIG. 10 shows a table containing source terminal identification information, pseudonymous identification information, and generation date/time information, stored in the first pseudonymous identification information acquiring device according to the first exemplary embodiment of the present invention;

FIG. 11 shows a table containing user identification information, and terminal identification information according to a second communication protocol, stored in the second pseudonymous identification information acquiring device according to the first exemplary embodiment of the present invention;

FIG. 12 shows a table containing source terminal identification information, pseudonymous identification information, and generation date/time information, stored in the second pseudonymous identification information acquiring device according to the first exemplary embodiment of the present invention;

FIG. 13 shows a table containing source terminal identification information, destination terminal identification information, and pseudonymous identification information, stored in a first communication relay device according to the first exemplary embodiment of the present invention;

FIG. 14 shows a table containing source terminal identification information, destination terminal identification information, and pseudonymous identification information, stored in a second communication relay device according to the first exemplary embodiment of the present invention;

EXEMPLARY EMBODIMENT

Exemplary embodiments of a communication relay system, a communication relay method, a communication system, a pseudonymous identification information acquiring device, a program, and a communication relay device, according to the present invention, will be described below with reference to FIGS. 1 to 25.

First Exemplary Embodiment

Configuration

Figure 1:
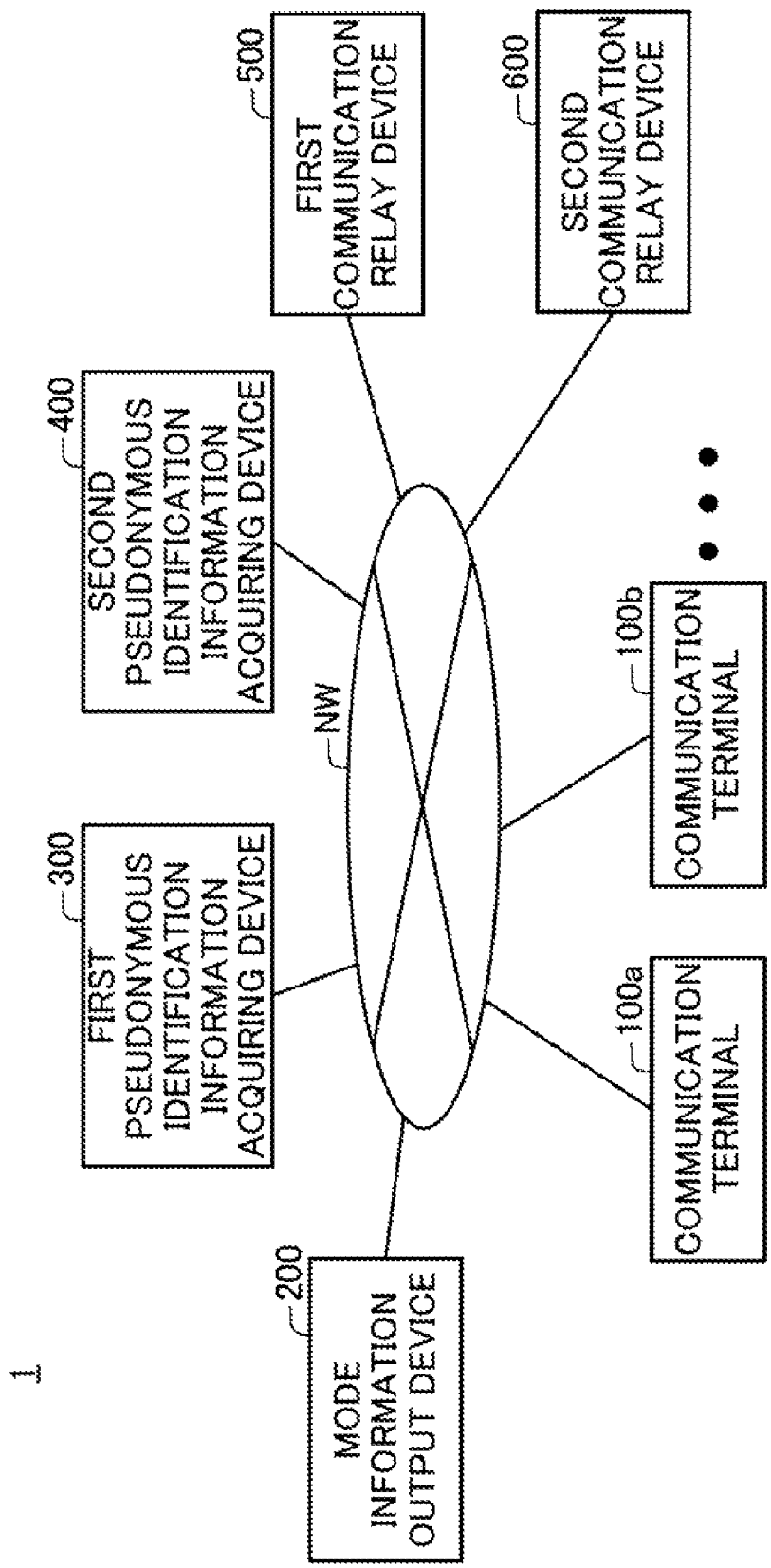
FIG. 1 is a diagram showing the schematic configuration of a communication system according to a first exemplary embodiment of the present invention.
Figure 2:
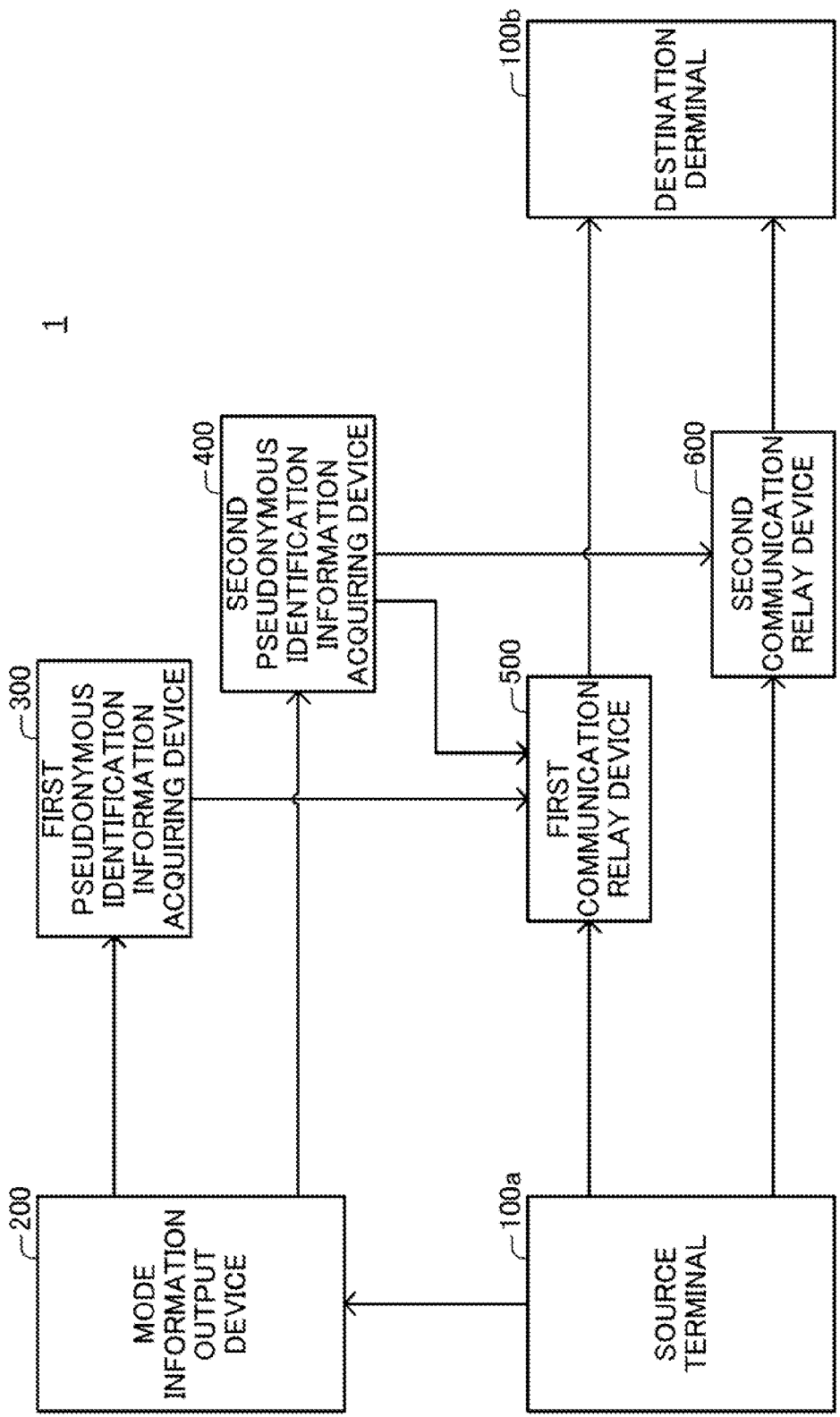
FIG. 2 is a block diagram showing the functional overview of the communication system according to the first exemplary embodiment of the present invention.

As shown in FIG. 1, a communication system 1 according to a first exemplary embodiment includes a plurality of communication terminals 100a, 100b, . . . , a mode information output device 200, a first pseudonymous identification information acquiring device 300, a second pseudonymous identification information acquiring device 400, a first communication relay device 500, and a second communication relay device 600. It should be noted that the mode information output device 200, the first pseudonymous identification information acquiring device 300, the second pseudonymous identification information acquiring device 400, the first communication relay device 500, and the second communication relay device 600 constitute a communication relay system. Further, the communication terminal 100a serves as a source terminal and the communication terminal 110b serves as a destination terminal.

The plurality of communication terminal 100a, 100b, . . . , the mode information output device 200, the first pseudonymous identification information acquiring device 300, the second pseudonymous identification information acquiring device 400, the first communication relay device 500, and the second communication relay device 600 are communicably connected with each other over communication networks NW constituting the IP (Internet Protocol) network.

Each of the communication terminals 100a, 100b, . . . , is an IP telephone. Further, each of the communication terminals 100a, 100b, . . . , includes a CPU (Central Processing Unit) not shown, and a memory. Each of the communication terminals 1 100a, 100b, . . . , is adapted to realize below-described functions by means of programs, stored in the memory, being executed by the CPU.

Each of the mode information output device 200, the first pseudonymous identification information acquiring device 300, the second pseudonymous identification information acquiring device 400, the first communication relay device 500, and the second communication relay device 600 is an information processor working as a server device.

Each server device has a CPU and storage devices (memory and HDD; Hard Disk Drive). Each server device is adapted to realize below-described functions by means of programs, stored in the storage devices, being executed by the CPU.

FIGS. 2 to 8 are block diagrams showing the functions of the communication system 1 configured as described above.

Figure 3:
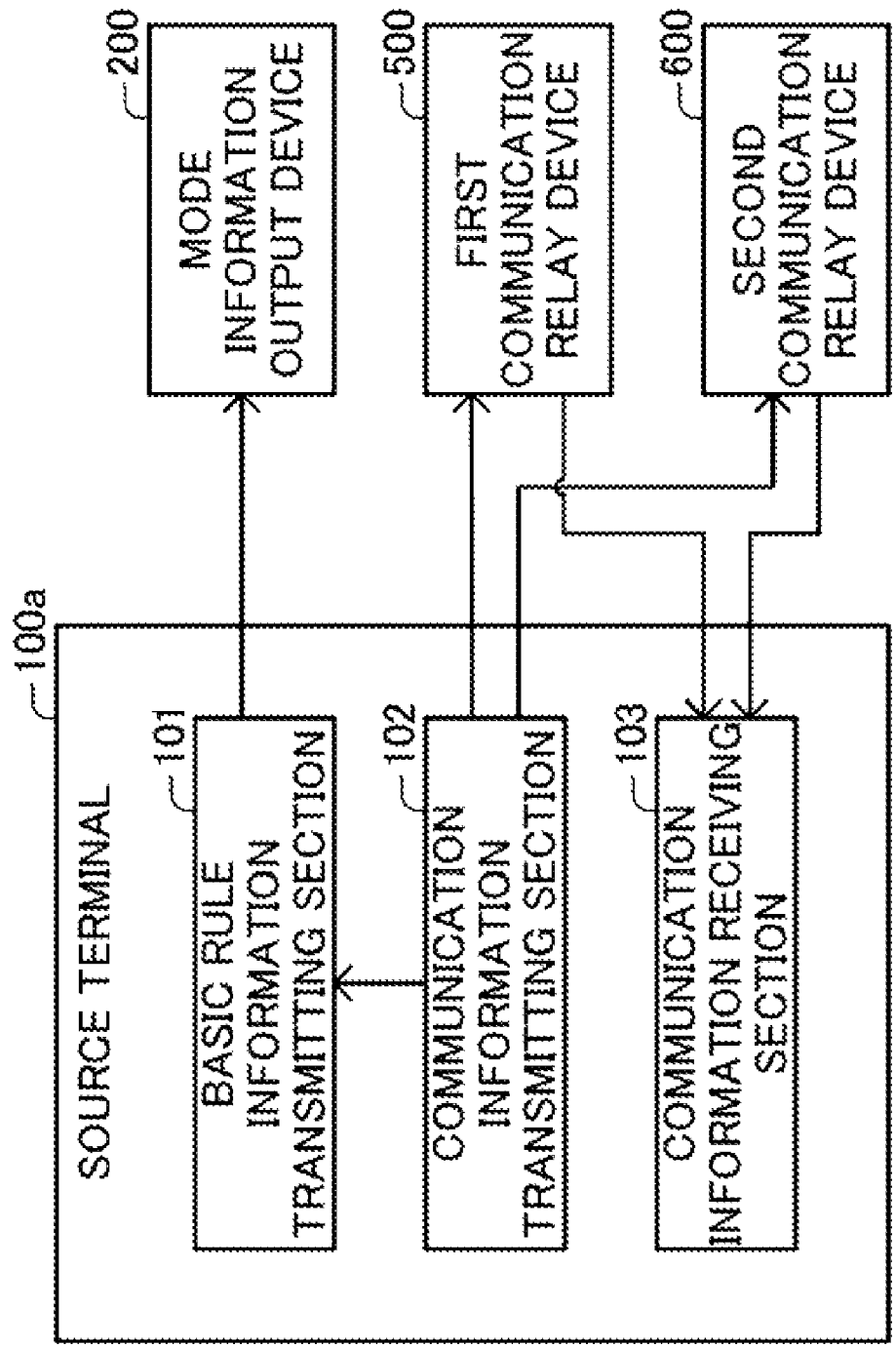
FIG. 3 is a block diagram showing the functional overview of a source terminal according to the first exemplary embodiment of the present invention.

As shown in FIG. 3, functions of the communication terminal 100a include a basic rule information transmitting section 101, a communication information transmitting section 102, and a communication information receiving section 103.

The communication information transmitting section 102 generates first communication information. The first communication information is information for establishing a communication session between the communication terminal 100a and a communication terminal other than the communication terminal 100a (the communication terminal 100b in this example).

In this example, the communication information transmitting section 102 divides an SIP message, formed in accordance with SIP (Session Initiation Protocol), according to IP to thereby generate IP packets in PDU (Protocol Data Units) as first communication information. It should be noted that in the present example, the SIP constitutes a first communication protocol, and the IP constitutes a second communication protocol. As such, the first communication information is information according to the first communication protocol and the second communication protocol.

Further, in the present example, it can be said that the second communication protocol is located on the physical layer side from the first communication protocol in OSI (Open Systems Interconnection) reference model.

The SIP message includes SIP-URI (Uniform Resource Identifier) as source terminal identification information, which is information for identifying a communication terminal serving as a source (source terminal). The SIP message also includes SIP-URI as destination terminal identification information, which is information for identifying a communication terminal serving as a destination (destination terminal).

The IP packet include an IP address as source terminal identification information which is information for identifying the communication terminal working as the source. The IP packet also includes an IP address as destination terminal identification information which is information for identifying the communication terminal working as the destination.

As such, the first communication information includes first source terminal identification information which is information according to the first communication protocol and for identifying the communication terminal serving as the source, and first destination terminal identification information which is information according to the first communication protocol and for identifying the communication terminal serving as the destination. The first communication information also includes second source terminal identification information which is information according to the second communication protocol and for identifying the communication terminal serving as the source, and second destination terminal identification information which is information according to the second communication protocol and for identifying the communication terminal serving as the destination.

The communication information transmitting section 102 transmits the generated first communication information to the first communication relay device 500.

The communication information transmitting section 102 also generates second communication information, which is voice information representing voice.

In this example, the communication information transmitting section 102 divides voice information generated in accordance with RTP (Realtime Transport Protocol) according to the IP to thereby generate IP packets as second communication information. It should be noted that in this example, RTP constitutes a third communication protocol. As such, the second communication information is information according to the second communication protocol and the third communication protocol.

The communication information transmitting section 102 transmits the generated second communication information to the first communication relay device 500 via the established communication session.

Prior to transmission of the first communication information (that is, information for establishing another communication session) by the communication information transmitting section 102, the basic rule information transmitting section 101 transmits basic rule information to the mode information output device 200. The basic rule information includes mode information, source user identification information, and destination user identification information.

The mode information is information about a mode for generating pseudonymous identification information described below. In this example, the mode information is information indicating a first mode in which different pseudonymous identification information is generated each time a communication session is established, or a second mode in which pseudonymous identification information is generated only when a communication session is established for the first time. In this example, the mode information is information input by a user of the communication terminal 100a. It should be noted that the mode information may be preset information.

The source user identification information is user identification information for identifying the user of the source terminal. The destination user identification information is user identification information for identifying the user of the destination terminal.

The communication information receiving section 103 receives the first communication information transmitted from a communication terminal other than the communication terminal 100a (in this example, communication terminal 100b) via the first communication relay device 500. The communication information receiving section 103 also receives second communication information transmitted from a communication terminal other than the communication terminal 100a (in this example, communication terminal 100b) via the second communication relay device 600.

The communication terminals 100b, . . . other that the communication terminal 100a also has the same functions as those of the communication terminal 100a.

In this way, the communication terminals 100a, 100b, . . . make communications according to a plurality of communication protocols.

Figure 4:
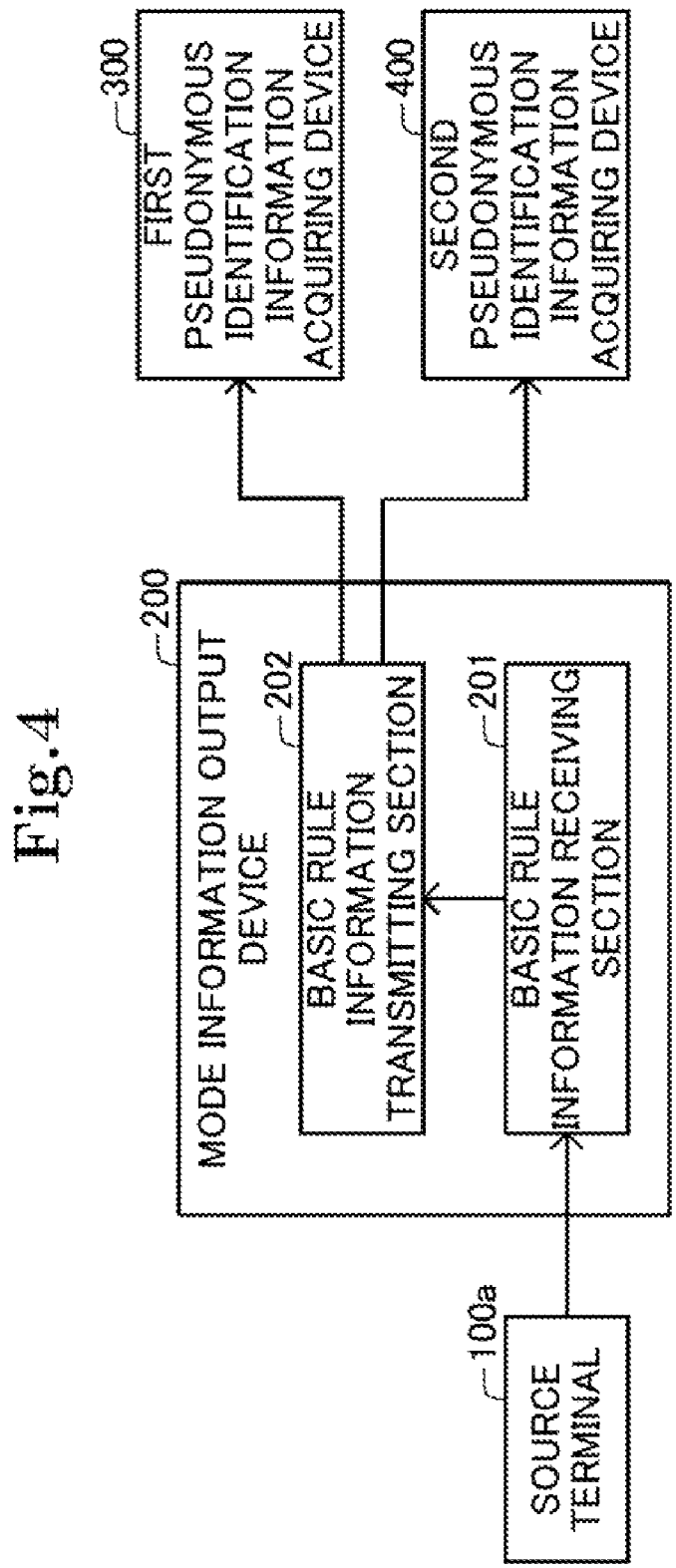
FIG. 4 is a block diagram showing the functional overview of a mode information output device according to the first exemplary embodiment of the present invention.

As shown in FIG. 4, functions of the mode information output device 200 include a basic rule information receiving section 201 and a basic rule information transmitting section (mode information output unit) 202.

The basic rule information receiving section 201 receives (accepts) basic rule information from the communication terminal 100a.

The basic rule information transmitting section 202 transmits (outputs) the basic rule information received by the basic rule information receiving section 201 to the first pseudonymous identification information acquiring device 300 and the second pseudonymous identification information acquiring device 400, respectively.

Figure 5:
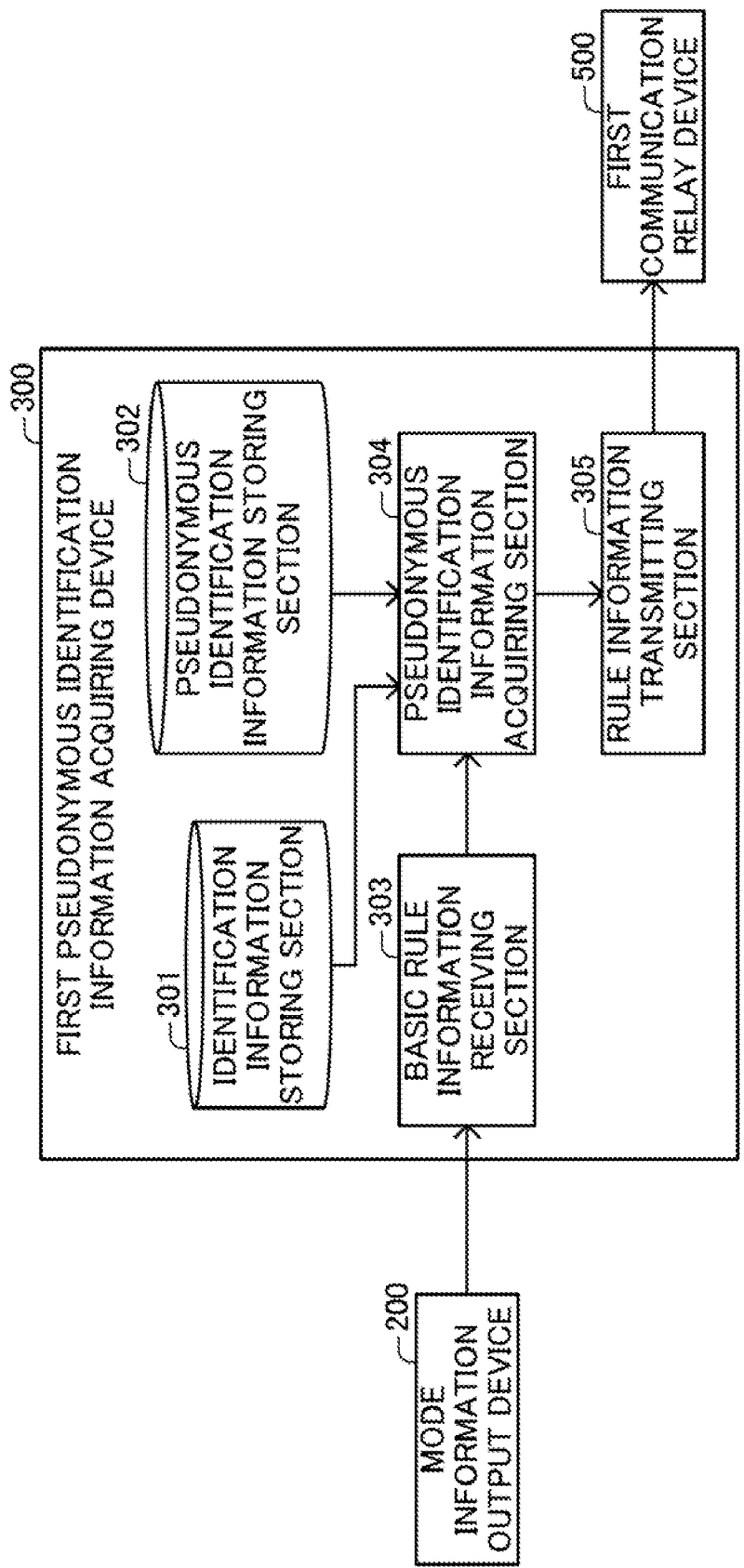
FIG. 5 is a block diagram showing the functional overview of a first pseudonymous identification information acquiring device according to the first exemplary embodiment of the present invention.

As shown in FIG. 5, functions of the first pseudonymous identification information acquiring device 300 include an identification information storing section (identification information storing unit) 301, a pseudonymous identification information storing section 302, a basic rule information receiving section 303, a pseudonymous identification information acquiring section 304, and a rule information transmitting section 305. The first pseudonymous identification information acquiring device 300 is associated with the SIP working as the first communication protocol.

As shown in FIG. 9, the identification information storing section 301 has stored user identification information ("Alice", "Bob", etc.) for identifying the user, and terminal identification information ("sip:alice@nec.com", "sip:bob@nec.com", etc.) which is information according to the first communication protocol and for identifying the communication terminal, while associating them.

The basic rule information receiving section 303 receives basic rule information from the mode information output device 200.

The pseudonymous identification information acquiring section 304 accepts the basic rule information received by the basic rule information receiving section 303.

The pseudonymous identification information acquiring section 304 acquires terminal identification information stored in the identification information storing section 301, while being associated with the source user identification information included in the accepted basic rule information, as source terminal identification information. The pseudonymous identification information acquiring section 304 also acquires terminal identification information stored in the identification information storing section 301, while being associated with the destination user identification information included in the accepted basic rule information, as destination terminal identification information.

In addition, the pseudonymous identification information acquiring section 304 acquires another pseudonymous identification information which is different from the source terminal identification information, while associating it with the acquired source terminal identification information. More specifically, the pseudonymous identification information acquiring section 304 acquires the pseudonymous identification information by generating the pseudonymous identification information according to the mode indicated by the mode information included in the accepted basic rule information.

The pseudonymous identification information is information for identifying the communication terminal according to the communication protocol (in this example, SIP) associated with the first pseudonymous identification information acquiring device 300, and is information different from information for identifying any one of the communication terminals 100a, 100b, . . . included in the communication system 1.

As shown in FIG. 10, if the pseudonymous identification information is acquired by the pseudonymous identification information acquiring section 304 in association with the source terminal identification information, the pseudonymous identification information storing section 302 stores the source terminal identification information ("sip:alice@nec.com", etc.), the pseudonymous identification information ("sip:vid888@nec.com", "sip:vid999@nec.com", etc.) and generation date/time information ("2009/05/19 11:33:44", "2009/05/19 11:44:55", etc.) indicating the date and time when the pseudonymous identification information was generated, while associating them with one another.

The rule information transmitting section 305 transmits rule information including the source terminal identification information, the destination terminal identification information, and the pseudonymous identification information, acquired by the pseudonymous identification information acquiring section 304, to the first communication relay device 500.

In this way, the first pseudonymous identification information acquiring device 300 constitutes a pseudonymous identification information acquiring unit (first pseudonymous identification information acquiring unit) associated with the first communication protocol.

Figure 6:
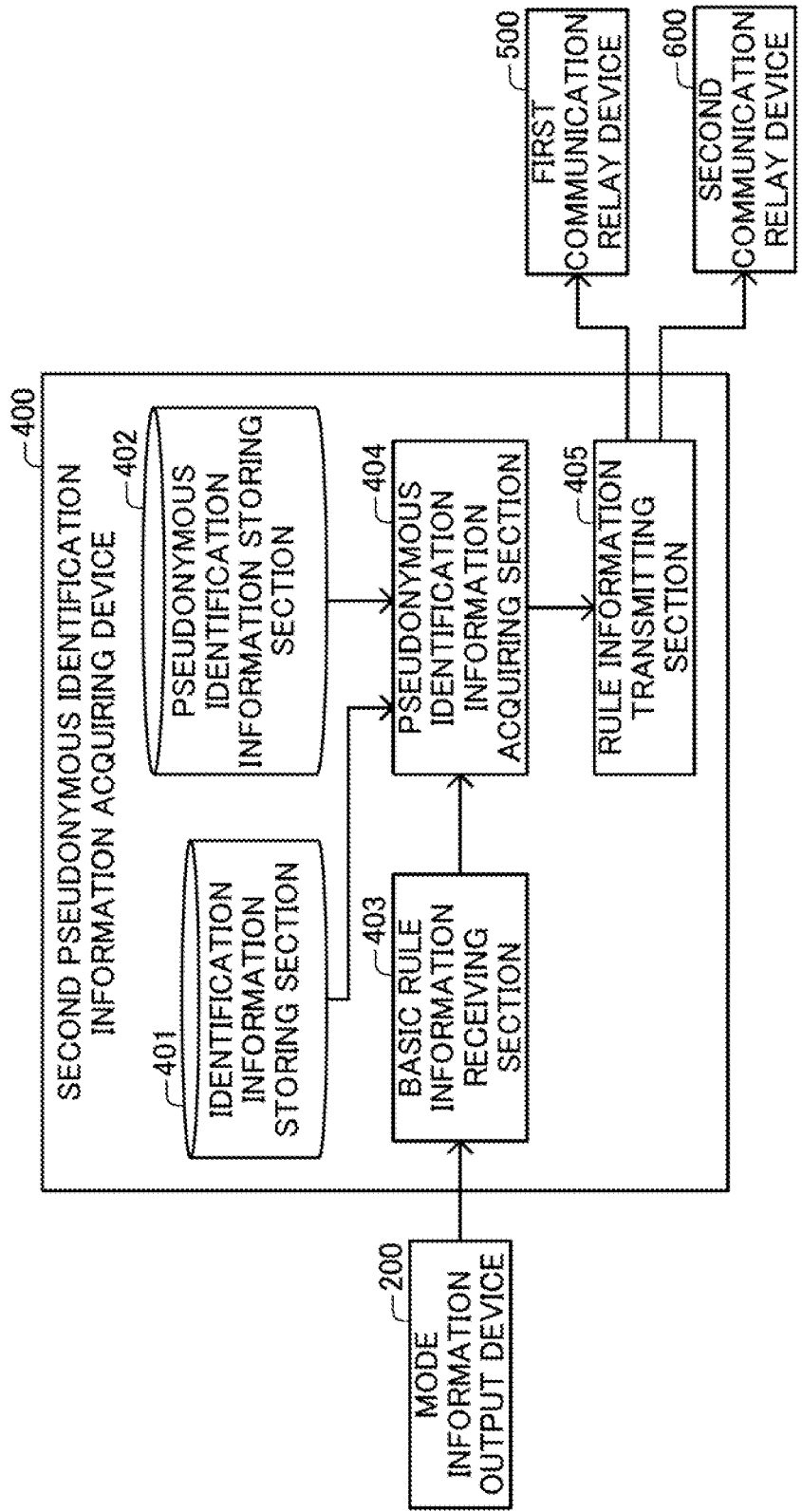
FIG. 6 is a block diagram showing the functional overview of a second pseudonymous identification information acquiring device according to the first exemplary embodiment of the present invention.

As shown in FIG. 6, functions of the second pseudonymous identification information acquiring device 400 include an identification information storing section (identification information storing unit) 401, a pseudonymous identification information storing section 402, a basic rule information receiving section 403, a pseudonymous identification information acquiring section 404, and a rule information transmitting section 405. The second pseudonymous identification information acquiring device 400 is associated with IP working as the second communication protocol.

As shown in FIG. 11, the identification information storing section 401 has stored user identification information ("Alice", "Bob", etc.) for identifying the user and terminal identification information ("192.168.1.1", "192.168.2.2", etc.) which is information according to the second communication protocol and for identifying the communication terminal, while associating them with each other.

Similar to the pseudonymous identification information storing section 302, if the pseudonymous identification information is acquired by the pseudonymous identification information acquiring section 404 in association with the source terminal identification information, the pseudonymous identification information storing section 402 stores the source terminal identification information ("192.68.1.1", etc.), the pseudonymous identification information ("192.168.10.88", "192.168.10.99", etc.), and generation date/time information indicating the date and time when the pseudonymous identification information was generated ("2009/05/19 11:33:44", "2009/05/19 11:44:55", etc.), while associating them with one another, as shown in FIG. 12.

The basic rule information receiving section 403 has the same functions as those of the basic rule information receiving section 303.

The pseudonymous identification information acquiring section 404 acquires the pseudonymous identification information by generating the pseudonymous identification information in accordance with the mode indicated by the mode information included in the accepted basic rule information, similar to the pseudonymous identification information acquiring section 304.

The pseudonymous identification information is information for identifying the communication terminal according to the communication protocol (in this example, IP) associated with the second pseudonymous identification information acquiring device 400, and is information different from information for identifying any one of the communication terminals 100a, 100b, . . . included in the communication system 1.

The rule information transmitting section 405 transmits the rule information including the source terminal identification information, the destination terminal identification information, and the pseudonymous identification information, acquired by the pseudonymous identification information acquiring section 404, to the first communication relay device 500 and the second communication relay device 600, respectively.

In this way, the second pseudonymous identification information acquiring device 400 constitutes the pseudonymous identification information acquiring unit (second pseudonymous identification information acquiring unit) associated with the second communication protocol.

Figure 7:
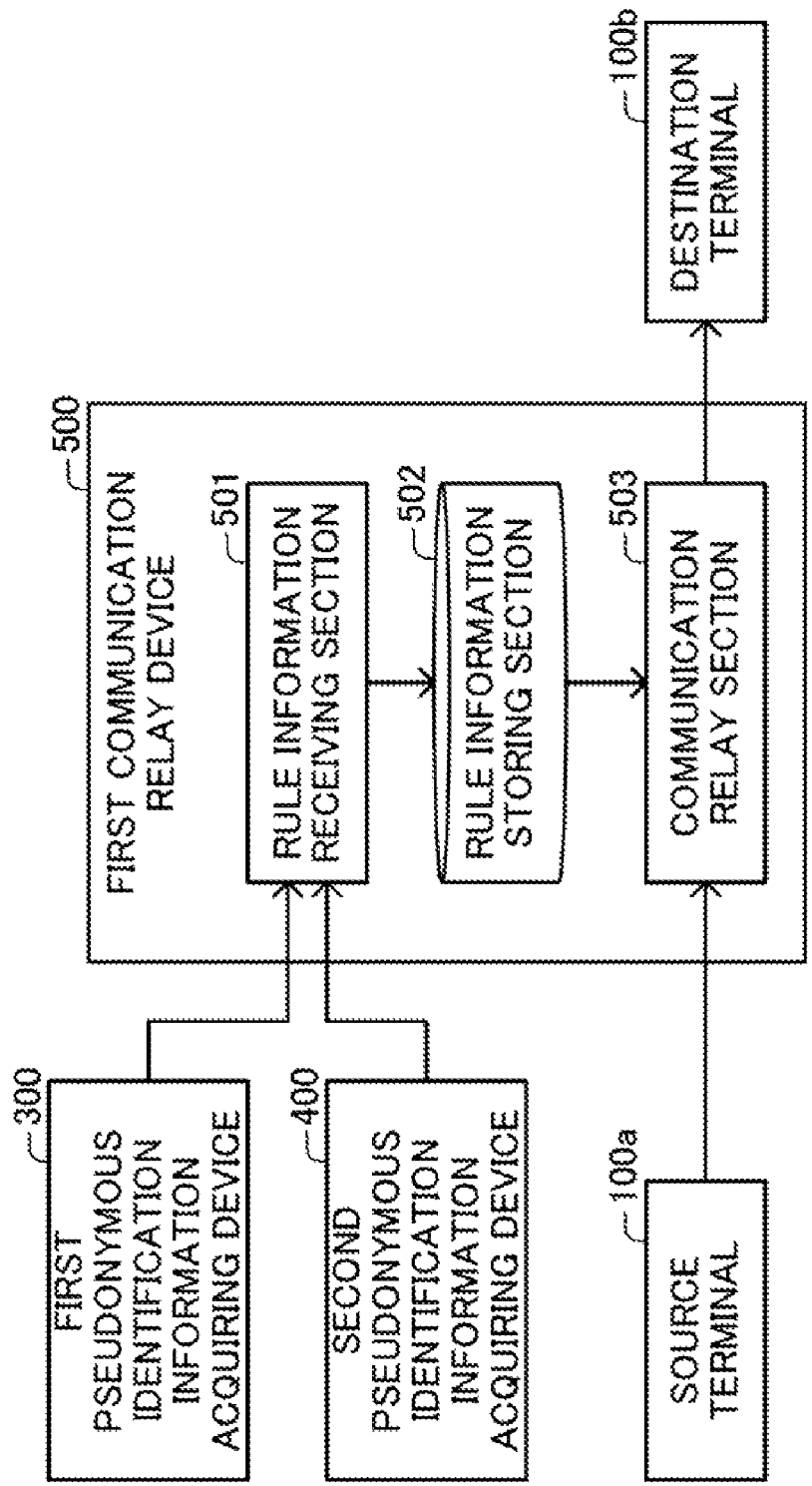
FIG. 7 is a block diagram showing the functional overview of a first communication relay device according to the first exemplary embodiment of the present invention.

As shown in FIG. 7, functions of the first communication relay device 500 include a rule information receiving section (pseudonymous identification information receiving unit) 501, a rule information storing section (pseudonymous identification information storing unit) 502, and a communication relay section (communication relay unit) 503.

The rule information receiving section 501 receives the rule information from the first pseudonymous identification information acquiring device 300 and the second pseudonymous identification information acquiring device 400.

If source terminal identification information and destination terminal identification information, which are identical to the source terminal identification information and the destination terminal identification information included in the rule information received by the rule information receiving section 501, are stored in association with each other, the rule information storing section 502 deletes the source terminal identification information, the destination terminal identification information, and the pseudonymous identification information associated with the source terminal identification information and the destination terminal identification information.

Then, as shown in FIG. 13, the rule information storing section 502 stores the source terminal identification information, the destination terminal identification information, and the pseudonymous identification information, which are included in the rule information received by the rule information receiving section 501, while associating them with one another.

The communication relay section 503 receives the first communication information from the communication terminals 100a, 100b, . . . . If source terminal identification information and destination terminal identification information, which are identical to the source terminal identification information and the destination terminal identification information included in the received first communication information, are stored in the rule information storing section 502, the communication relay section 503 acquires the pseudonymous identification information stored in association with the source terminal identification information and the destination terminal identification information.

In that case, the communication relay section 503 replaces the source terminal identification information included in the received first communication information with the acquired pseudonymous identification information, and transmits the first communication information after the replacement to the communication terminal 100a, 100b, identified by the destination terminal identification information.

Further, if the destination terminal identification information included in the received first communication information conforms with the pseudonymous identification information stored in the rule information storing section 502, the communication relay section 503 acquires the source terminal identification information stored in association with the pseudonymous identification information.

In that case, the communication relay section 503 replaces the destination terminal identification information included in the received first communication information with the acquired source terminal identification information, and transmits the first communication information after the replacement to the communication terminals 100a, 100b, . . . identified by the source terminal identification on information.

In this way, the first communication relay device 500 relays the communications between the source terminal 100a and the destination terminal 100b performed in accordance with a plurality of communication protocols (in this example, the first communication protocol and the second communication protocol.

As shown in FIG. 8, functions of the second communication relay device 600 include a rule information receiving section (pseudonymous identification information receiving unit) 601, a rule information storing section (pseudonymous identification information storing unit) 602, and a communication relay section (communication relay unit) 603.

The rule information receiving section 601 receives rule information from the second pseudonymous identification information acquiring device 400.

If source terminal identification information and destination terminal identification information which are identical to the source terminal identification information and the destination terminal identification information stored in the rule information received by the rule information receiving section 601 are stored in association with each other, the rule information storing section 602 deletes the source terminal identification information, the destination terminal identification information, and the pseudonymous identification information associated with the source terminal identification information and the destination terminal identification information.

Then, as shown in FIG. 14, the rule information storing section 602 stores the source terminal identification information, the destination terminal identification information, and the pseudonymous identification information, which are included in the rule information received by the rule information receiving section 601, while associating them with one another.

The communication relay section 603 receives second communication information from the communication terminal 100a, 100b, . . . . If source terminal identification information and destination terminal identification information which are identical to the source terminal identification information and the destination terminal identification information included in the received second communication information are stored in the rule information storing section 602, the communication relay section 603 acquires the pseudonymous identification information which is stored in association with the source terminal identification information and the destination terminal identification information.

In that case, the communication relay section 603 replaces the source terminal identification information included in the received second communication information with the acquired pseudonymous identification information, and transmits the second communication information after the replacement to the communication terminal 100a, 100b, . . . identified by the destination terminal identification information.

Further, if the destination terminal identification information included in the received second communication information conforms with the pseudonymous identification information stored in the rule information storing section 602, the communication relay section 603 acquires the source terminal identification information stored in association with the pseudonymous identification information.

In that case, the communication relay section 603 replaces the destination terminal identification information included in the received second communication information with the acquired source terminal identification information, and transmits the second communication information after the replacement to the communication terminal 100a, 100b, . . . identified by the source terminal identification information.

In this way, the second communication relay device 600 relays the communications performed between the source terminal 100a and the destination terminal 100b according to a plurality of communication protocols (in this example, the second communication protocol and the third communication protocol).

(Operation)

Figure 15:
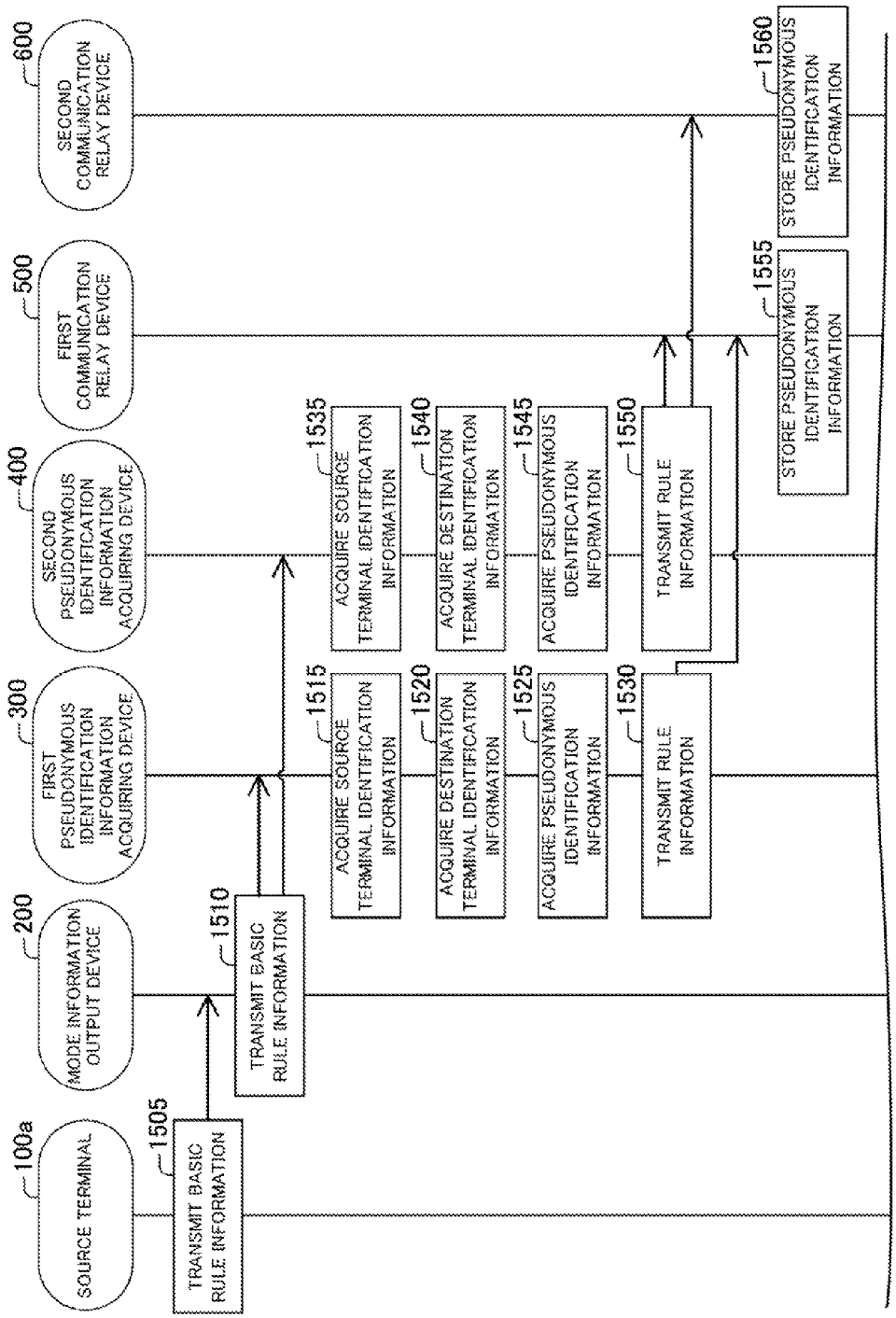
FIG. 15 is a sequence chart showing an operation to set pseudonymous identification information among operations of the communication system according to the first exemplary embodiment of the present invention.

Next, operation of the communication system 1 will be described with reference to the sequence chart shown in FIG. 15.

First, description will be given based on the premise that a user of the source terminal 100a inputs mode information indicating a second mode and also inputs information showing SIP-URI (in this example, "sip:bob@nec.com") of the destination terminal 100b as destination terminal specifying information for specifying the destination communication terminal.

In this case, the source terminal 100a transmits the basic rule information to the mode information output device 200 (step 1505). The basic rule information includes the mode information (in this example, mode information indicating the second mode) input by the user of the source terminal 100a, the source user identification information (in this example, information indicating "Alice") for identifying the user of the source terminal 100a, and the destination user identification information (in this example, information indicating "Bob") for identifying the user of the destination terminal 100b.

Thereby, the mode information output device 200 receives the basic rule information from the communication terminal 100a. Then, the mode information output device 200 transmits the received basic rule information to the first pseudonymous identification information acquiring device 300 and the second pseudonymous identification information acquiring device 400, respectively (step 1510).

Thereby, the first pseudonymous identification information acquiring device 300 receives the basic rule information from the mode information output device 200. Then, the first pseudonymous identification information acquiring device 300 acquires the terminal identification information (in this example, information indicating "sip:alice@nec.com") stored in the identification information storing section 301 in association with the source user identification information (in this example, information indicating "Alice") included in the received basic rule information, as source terminal identification information (step 1515).

The first pseudonymous identification information acquiring device 300 also acquires terminal identification information (in this example, information indicating "sip:bob@nec.com") stored in the identification information storing section 301 in association with the destination user identification information (in this example, information indicating "Bob") included in the received basic rule information, as destination terminal identification information (step 1520).

Then, the first pseudonymous identification information acquiring device 300 acquires pseudonymous identification information (in this example, information indicating "sip:vid888@nec.com") in association with the acquired source terminal identification information according to the mode indicated by the mode information (in this example, second mode) included in the basic rule information (step 1525). It should be noted that the details of the processes through which the first pseudonymous identification information acquiring device 300 and the second pseudonymous identification information acquiring device 400 acquire pseudonymous identification information will be described below.

Then, the first pseudonymous identification information acquiring device 300 transmits rule information including the source terminal identification information, the destination terminal identification information, and the pseudonymous identification information, which have been acquired, to the first communication relay device 500 (step 1530).

Similarly, the second pseudonymous identification information acquiring device 400 receives the basic rule information from the mode information output device 200. Then, the second pseudonymous identification information acquiring device 400 acquires terminal identification information (in this example, information indicating "192.168.1.1") stored in the identification information storing section 401 in association with the source user identification information (in this example, information indicating "Alice") included in the received basic rule information, as source terminal identification information (step 1535).

Further, the second pseudonymous identification information acquiring device 400 acquires the terminal identification information (in this example, information indicating "192.168.2.2") stored in the identification information storing section 401 in association with the destination user identification information (in this example, information indicating "Bob") included in the received basic rule information, as the destination terminal identification information (step 1540).

Then, the second pseudonymous identification information acquiring device 400 acquires pseudonymous identification information (in this example, information indicating "192.168.10.88") in association with the acquired source terminal identification information according to the mode (in this example, the second mode) indicated by the mode information included in the basic rule information (step 1545).

Then, the second pseudonymous identification information acquiring device 400 transmits the rule information including the source terminal identification information, the destination terminal identification information, and the pseudonymous identification information, which have been acquired, to the first communication relay device 500 and the second communication relay device 600, respectively (step 1550).

The first communication relay device 500 receives the rule information transmitted from the first pseudonymous identification information acquiring device 300 and the second pseudonymous identification information acquiring device 400, respectively.

Then, if source terminal identification information and destination terminal identification information, which are identical to the source terminal identification information and the destination terminal identification information included in the rule information received from the first pseudonymous identification information acquiring device 300, are stored in association with each other, the first communication relay device 500 deletes the source terminal identification information, the destination terminal identification information, and the pseudonymous identification information associated with the source terminal identification information and the destination terminal identification information, from the storage device.

Similarly, if source terminal identification information and destination terminal identification information, which are identical to the source terminal identification information and the destination terminal identification information stored in the rule information received from the second pseudonymous identification information acquiring device 400, are stored in association with each other, the first communication relay device 500 deletes the source terminal identification information, the destination terminal identification information, and the pseudonymous identification information associated with the source terminal identification information and the destination terminal identification information, from the storage device.

Then, the first communication relay device 500 stores the source terminal identification information, the destination terminal identification information, and the pseudonymous identification information, which are included in the rule information received from the first pseudonymous identification information acquiring device 300, in the rule information storing section 502 while associating them with one another.

Similarly, the first communication relay device 500 stores the source terminal identification information, the destination terminal identification information, and the pseudonymous identification information, which are included in the rule information received from the second pseudonymous identification information acquiring device 400, in the rule information storing section 502 while associating them with one another (step 1555).

Further, the second communication relay device 600 receives the rule information transmitted from the second pseudonymous identification information acquiring device 400.

Then, if source terminal identification information and destination terminal identification information, which are identical to the source terminal identification information and the destination terminal identification information included in the rule information received from the second pseudonymous identification information acquiring device 400, are stored in association with each other, the second communication relay device 600 deletes the source terminal identification information, the destination terminal identification information, and the pseudonymous identification information associated with the source terminal identification information and the destination terminal identification information, from the storage device.

Similarly, the second communication relay device 600 stores the source terminal identification information, the destination terminal identification information, and the pseudonymous identification information, which are included in the rule information received from the second pseudonymous identification information acquiring device 400, in the rule information storing section 602 while associating them with one another (step 1560).

Figure 16:
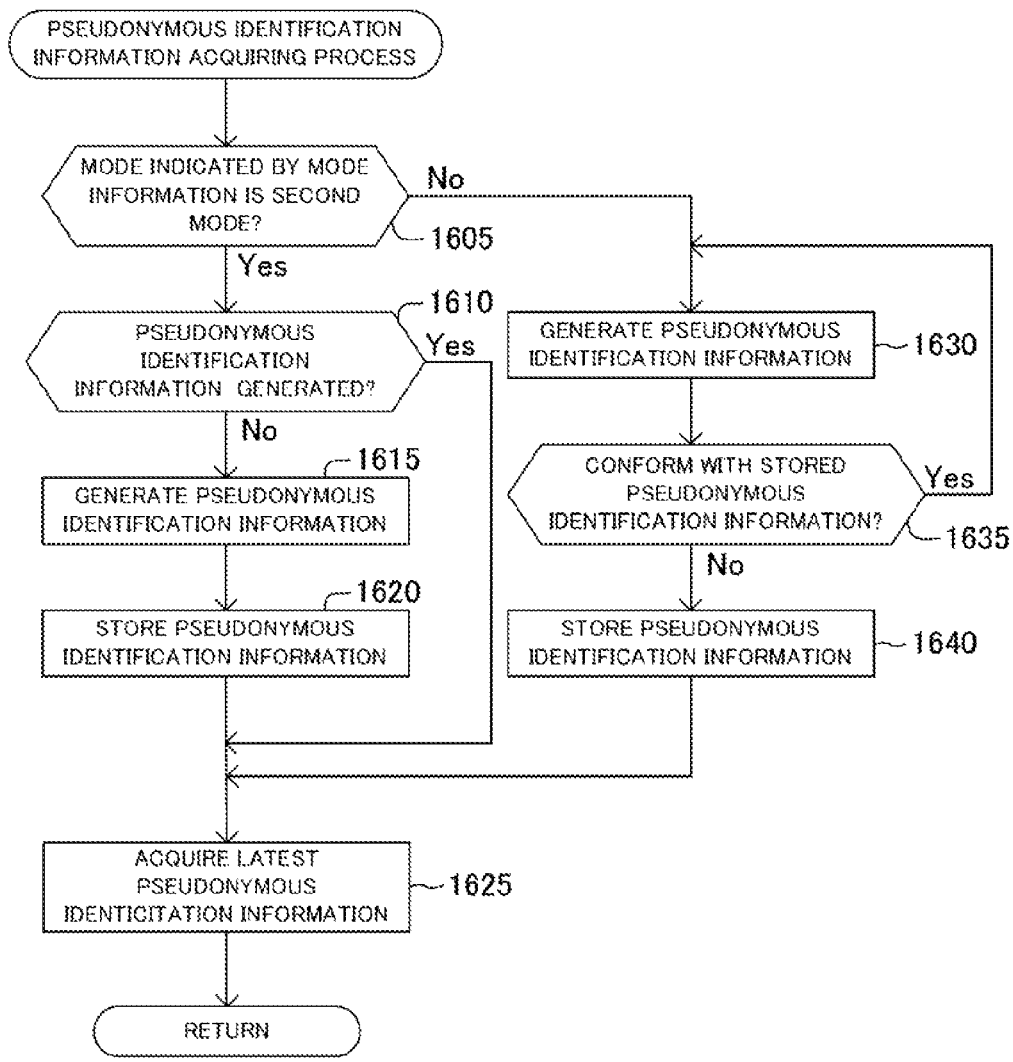
FIG. 16 is a flowchart showing processes to be performed for acquiring pseudonymous identification information by the first pseudonymous identification information acquiring device according to the first exemplary embodiment of the present invention.

Now, the details of the processes of acquiring the pseudonymous identification information by the first pseudonymous identification information acquiring device 300 will be described with reference to the flowchart of FIG. 16.

When beginning the process, the first pseudonymous identification information acquiring device 300 determines whether or not the mode indicated by the mode information included in the basic rule information is the second mode (step 1605).

As described above, in this example, the first mode is a mode for generating different pseudonymous identification information each time a communication session is established, and the second mode is a mode for generating pseudonymous identification information only when a communication session is established for the first time.

According to the above, as the mode information indicates the second mode, the first pseudonymous identification information acquiring device 300 determines that the result is "Yes" and moves to step 1610, and determines whether or not pseudonymous identification information has been generated.

Specifically, the first pseudonymous identification information acquiring device 300 determines that pseudonymous identification information has been generated if pseudonymous identification information is stored in the pseudonymous identification information storing section 302 in association with source terminal identification information which is identical to the source terminal identification information (in this example, information indicating "sip:alice@nec.com") acquired at step 1515.

Now, the case where pseudonymous identification information is not stored in the pseudonymous identification information storing section 302 in association with source terminal identification information identical to the source terminal identification information acquired at step 1515 will be considered. In this case, the first pseudonymous identification information acquiring device 300 determines that the result is "No" at step 1610 and moves to step 1615, and generates pseudonymous identification information (in this example, information indicating "sip:vid888@nec.com".

In this example, the first pseudonymous identification information acquiring device 300 generates SIP-URI, having a character string in which three-digits integers randomly determined is added to a character string "vid" as a user name, as pseudonymous identification information which differs from any information for identifying the communication terminal 100*a*, 100*b*, . . . included in the communication system 1.

Then, the first pseudonymous identification information acquiring device 300 stores the pseudonymous identification information generated at step 1615, the source terminal identification information acquired at step 1515, and generation date/time information indicating the current date and time, in the pseudonymous identification information storing section 302, while associating them with one another.

The first pseudonymous identification information acquiring device 300 moves to step 1625 to acquire pseudonymous identification information associated with generation date/time information indicating the latest date and time, among the pseudonymous identification information stored in the pseudonymous identification information storing section 302 in association with the source terminal identification information acquired at step 1515. Thereby, the first pseudonymous identification information acquiring device 300 ends the process of acquiring the pseudonymous identification information.

At the time when the first pseudonymous identification, information acquiring device 300 moves to step 1610, if pseudonymous identification information is stored in the pseudonymous identification information storing section 302 in association with source terminal identification information which is identical to the source terminal identification information acquired at step 1515, the first pseudonymous identification information acquiring device 300 determines that the result is "Yes" and directly moves to step 1625 to acquire the pseudonymous identification information, and ends the process.

Next, the case where the mode information included in the received basic rule information is the first mode will be described.

In this case, the first pseudonymous identification information acquiring device 300 determines that the result is "No" at step 1605 and moves to step 1630, and generates SIP-URI having a character string in which three-digits integers randomly determined using random numbers is added to a character string "vid" as a user name, as pseudonymous identification information.

Then, the first pseudonymous identification information acquiring device 300 determines whether or not pseudonymous identification information, which is identical to the pseudonymous identification information generated at step 1630, is stored in association with source terminal identification information which is identical to the source terminal identification information acquired at step 1515 (which means that the generated pseudonymous identification information conforms with the stored pseudonymous identification information) (step 1635).

Now, it is assumed that pseudonymous identification information which is identical to the generated pseudonymous identification information is not stored in association with source terminal identification information identical to the acquired source terminal identification information. In that case, the first pseudonymous identification information acquiring device 300 determines that the result is "No" and moves to step 1644), and stores the pseudonymous identification information, the source terminal identification information acquired at step 1515, and generation date/time information indicating the current date and time, in the pseudonymous identification information storing section 302 while associating them to one another.

Then, the first pseudonymous identification information acquiring device 300 moves to step 1625 to acquire pseudonymous identification information associated with generation time/date information indicating the latest date and time among the pseudonymous identification information stored in the pseudonymous identification information storing section 302 in association with the source terminal identification information acquired at step 1515. Thereby, the first pseudonymous identification information acquiring device 300 ends the process of acquiring the pseudonymous identification information.

It should be noted that if pseudonymous identification information which is identical to the generated pseudonymous identification information is stored in association with source terminal identification information which is identical to the acquired source terminal identification information, the first pseudonymous identification information acquiring device 300 determines that the result is "Yes" at step 1635 and moves to step 1630 to generate pseudonymous identification information again.

A process of acquiring pseudonymous identification information by the second pseudonymous identification information acquiring device 400 is similar to that taken by the first pseudonymous identification information acquiring device 300.

Next, operation of the communication system 1 after the first communication relay device 500 and the second communication relay device 600 store the pseudonymous identification information will be described with reference to the sequence charts shown in FIGS. 17 and 18.

Figure 17:
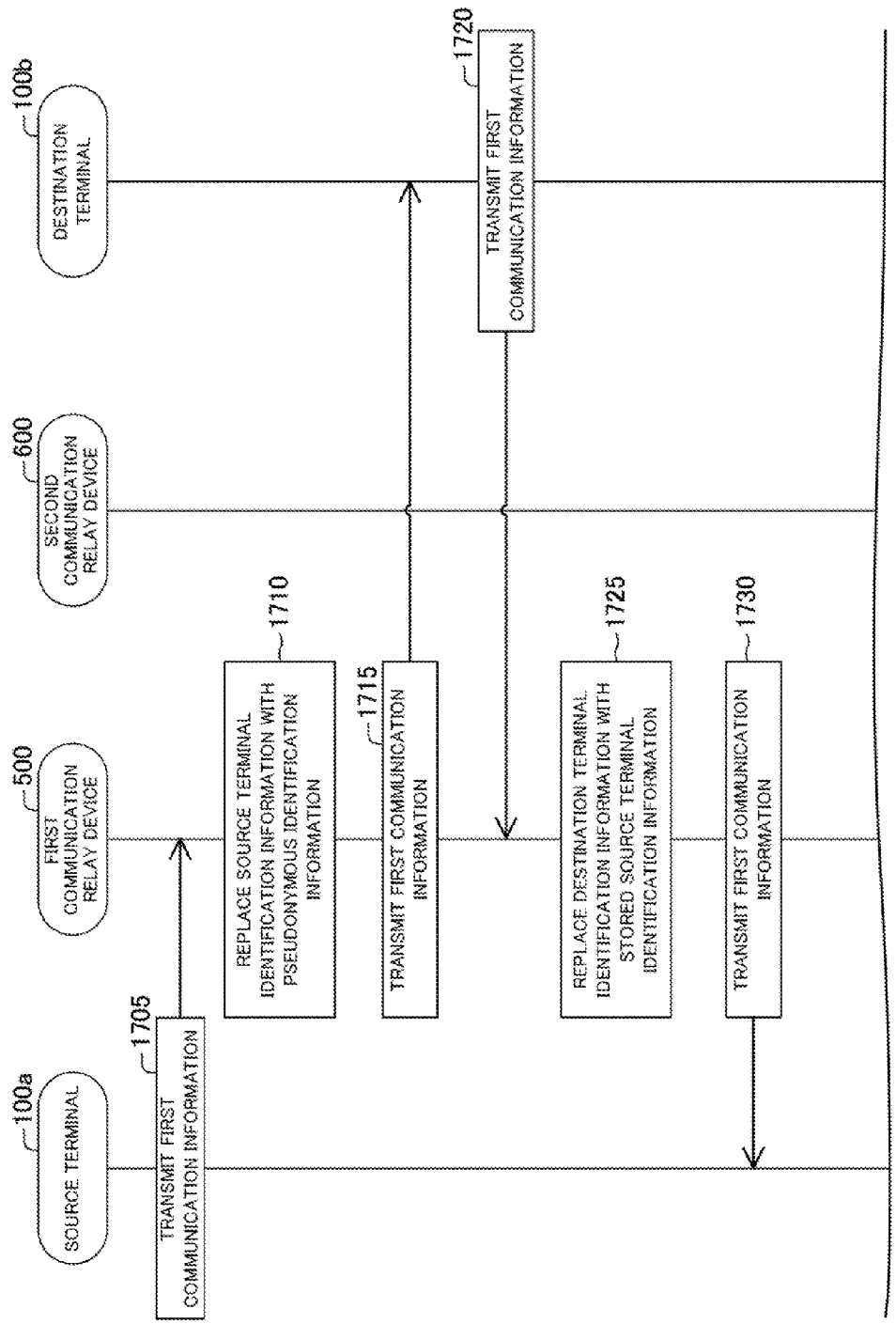
FIG. 17 is a sequence chart showing an operation to relay first communication information among operations of the communication system according to the first exemplary embodiment of the present invention.

As shown in FIG. 17, the source terminal 100*a* transmits first communication information, as information for establishing another communication session, to the first communication relay device 500 (step 1705).

It should be noted that the first communication information is constituted from a plurality of IP packets generated by dividing an SIP message conforming with SIP in accordance with IP. The SIP message constituting the first communication information includes information indicating "sip:alice@nec.com" as source terminal identification information, and information indicating "sip:bob@nec.com" as destination terminal identification information. Further, the IP packets constituting the first communication information include information indicating "192.168.1.1" as source terminal identification information, and information indicating the IP address of the first communication relay device 500 as destination terminal identification information.

Thereby, the first communication relay device 500 receives first communication information from the source terminal 100*a*. The first communication relay device 500 acquires information indicating the IP address of the destination terminal 100*b* identified by the destination terminal identification information (that is, information indicating "sip:bob@nec.com") included in the SIP message constituting the first communication information.

Then, the first communication relay device 500 replaces the destination terminal identification information (namely information indicating the IP address of the first communication relay device 500) included in the IP packets constituting the received first communication information, with information indicating the IP address ("192.168.2.2") of the acquired destination terminal 100*b*.

Then, if source terminal identification information and destination terminal identification information, which are identical to the source terminal identification information and the destination terminal identification information included in the received first communication information, are stored in the rule information storing section 502, the first communication relay device 500 acquires pseudonymous identification information stored in association with the source terminal identification information and the destination terminal identification information.

In this example, the source terminal identification information and the destination terminal identification information included in the first communication information received by the first communication relay device 500 are "sip:alice@nec.com" and "sip:bob@nec.com", and "192.168.1.1" and "192.168.2.2".

As such, the first communication relay device 500 acquires pseudonymous identification information (in this example, information indicating "sip:vid888@nec.com") stored in association with "sip:alice@nec.com" and "sip:bob@nec.com. Similarly, the first communication relay device 500 acquires pseudonymous identification information (in this example, information indicating "192.168.10.88") stored in association with "92.168.1.1" and "192.168.2.2".

Then, the first communication relay device 500 replaces the source terminal identification information (information indicating "sip:alice@nec.com") included in the SIP message constituting the received first communication information, with the acquired pseudonymous identification information (information indicating "sip:vid888@nec.com"). The first communication relay device 500 also replaces the source terminal identification information (information indicating "192.168.1.1"), included in the IP packet constituting the received first communication information, with the pseudonymous identification information (information indicating "192.168.10.88") (step 1710).

Then, the first communication relay device 500 transmits the first communication information, after the replacement, to the destination terminal 100*b* identified by the destination terminal identification information (step 1715).

Thereby, the destination terminal 100*b* receives the first communication information. The source terminal identification information included in the first communication information received by the destination terminal 100*b* is information indicating "sip:vid888@nec.com" and information indicating "192.168.10.88". As such, the user of the destination terminal 100*b* cannot specify the source terminal 100*a″*.

Thereafter, the destination terminal 100*b* transmits the first communication information as information for replying to the received first communication information, to the first communication relay device 500 (step 1720).

The SIP message constituting the first communication information includes information indicating "sip:bob@nec.com" as source terminal identification information, and information indicating "sip:vid888@nec.com", as destination terminal identification information. Further, the IP packet includes information indicating "192.168.2.2" as source terminal identification information, and information indicating the IP address of the first communication relay device 500 as destination terminal identification information.

Thereby, the first communication relay device 500 receives the first communication information from the destination terminal 100b. The first communication relay device 500 acquires source terminal identification information (information indicating "sip:alice@nec.com") stored in association with the destination terminal identification information (namely, information indicating "sip:vid888@nec.com" which is pseudonymous identification information) included in the IP messages constituting the received first communication information.

Then, the first communication relay device 500 replaces the destination terminal identification information (information indicating "sip:vid888®nec.com") included in the SIP message constituting the received first communication information, with the acquired source terminal identification information (information indicating "sip:alice@nec.com") (step 1725).

The first communication relay device 500 also acquires information indicating the IP address of the source terminal 100a identified by the destination terminal identification information (information indicating "sip:alice@nec.com") included in the SIP message after the replacement.

Then, the first communication relay device 500 replaces the destination terminal identification information (namely, information indicating the IP address of the first communication relay device 500) included in the IP packet constituting the received first communication information, with information indicating the acquired IP address ("192.168.1.1") of the source terminal 100a.

Then, the first communication relay device 500 transmits the first communication information after the replacement to the source terminal 100a identified by the destination terminal identification information (step 1730). Thereby, the source terminal 100a receives the first communication information.

Through these processes, a communication session is established between the source terminal 100a and the destination terminal 100b.

After that, the source terminal 100a and the destination terminal 100b transmit and receive second communication information using the established communication session.

Figure 18:
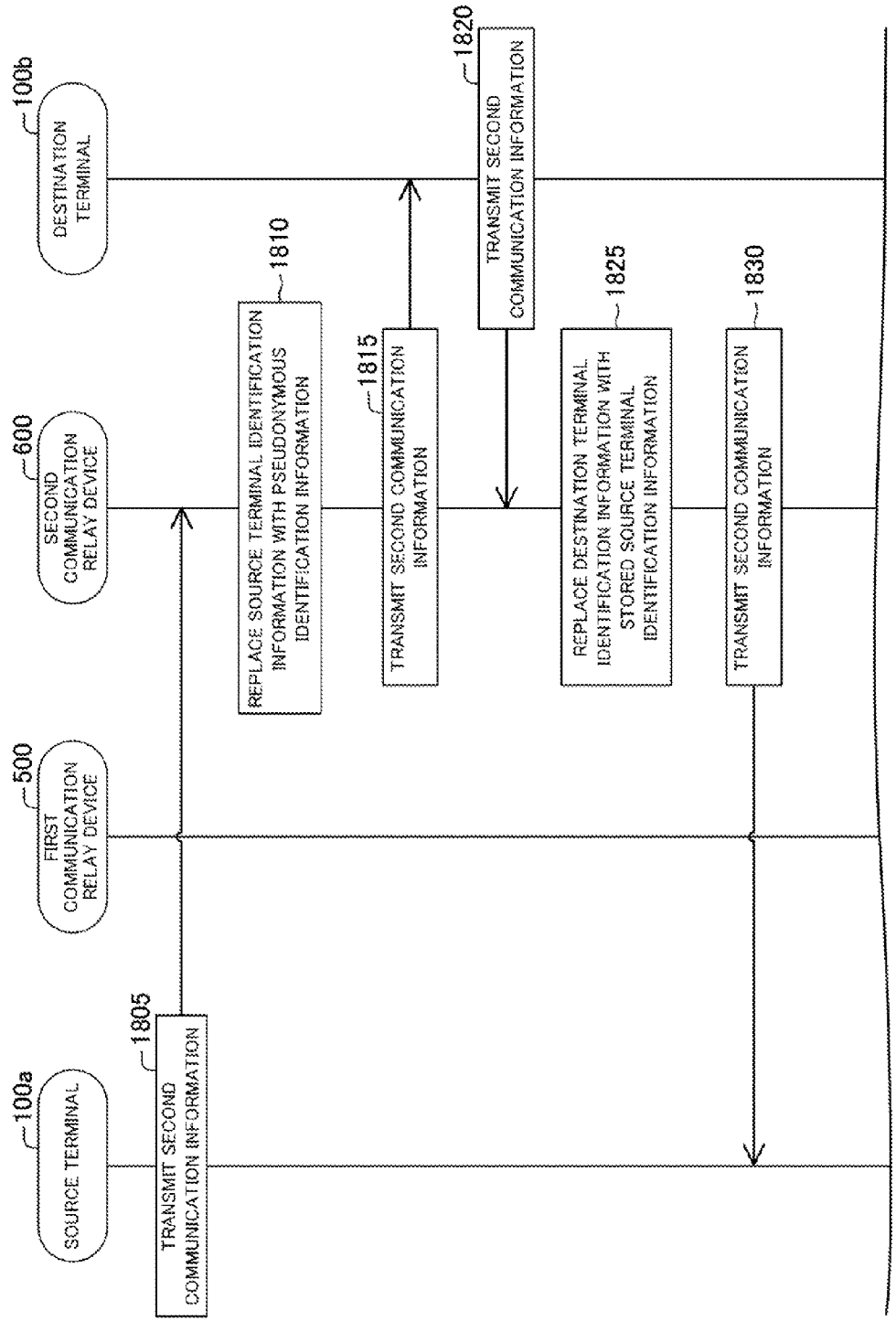
FIG. 18 is a sequence chart showing an operation to relay second communication information among operations of the communication system according to the first exemplary embodiment of the present invention.

As shown in FIG. 18, the source terminal 100a transmits the second communication information as voice information indicating voices to the second communication relay device 600 (step 1805).

It should be noted that the second communication information is constituted from a plurality of IP packets generated by dividing voice information, formed according to RTP, in accordance with IP. The IP packets constituting the second communication information include information indicating "192.168.1.1" as source terminal identification information, and information indicating "192.168.2.2" as destination terminal identification information.

Thereby, the second communication relay device 600 receives the second communication information from the source terminal 100a. Then, if source terminal identification information and destination terminal identification information which are identical to the source terminal identification information and the destination terminal identification information included in the received second communication information are stored in the rule information storing section 602, the second communication relay device 600 acquires pseudonymous identification information stored in association with the source terminal identification information and the destination terminal identification information.

In this example, the source terminal identification information and the destination terminal identification information included in the second communication information received by the second communication relay device 600 are "192.168.1.1" and "192.168.2.2".

Accordingly, the second communication relay device 600 acquires pseudonymous identification information (in this example, information indicating "192.168.10.88") stored in association with "192.168.1.1" and "192.168.2.2".

Then, the second communication relay device 600 replaces the source terminal identification information (information indicating "192.168.1.1") included in the IP packets constituting the received second communication information, with the acquired pseudonymous identification information (information indicating "192.168.10.88" (step 1810).

Then, the second communication relay device 600 transmits the second communication information after the replacement to the destination terminal 100b identified by the destination terminal identification information (step 1815).

Thereby, the destination terminal 100b receives the second communication information. The source terminal identification information included in the second communication information received by the destination terminal 100b is information indicating "192.168.10.88". As such, the user of the destination terminal 100b is not able to specify the source terminal 100a.

Similarly, the destination terminal 100b transmits the second communication information to the second communication relay device 600 (step 1820).

The IP packets constituting the second communication information include information indicating "192.168.2.2" as source terminal identification information, and information indicating "192.168.10.88" as destination terminal identification information.

Thereby, the second communication relay device 600 receives the second communication information from the destination terminal 100b. The second communication relay device 600 acquires source terminal identification information (information indicating "192.168.1.1") stored in association with the destination terminal identification information (namely, information indicating "192.168.10.88" which is the pseudonymous identification information) included in the IP packets constituting the received second communication information.

Then, the second communication relay device 600 replaces the destination terminal identification information (information indicating "192.168.10.88") included in the IP packets constituting the received second communication information with the acquired source terminal identification information (information indicating "192.168.1.1") (step 1825).

Then, the second communication relay device 600 transmits the second communication information after the replacement to the source terminal 100a identified by the destination terminal identification information (step 1830). Thereby, the source terminal 100a receives the second communication information.

Through these steps, the source terminal 100a and the destination terminal 100b transmit and receive voice information between each other.

As described above, according to the first exemplary embodiment of the communication system of the present invention, when a new communication protocol is added to communications performed between a plurality of communication terminals, a pseudonymous identification information acquiring device corresponding to the added protocol is added, whereby a process of acquiring pseudonymous identification information can be performed with respect to the communication protocol.

Further, according to this configuration, maintenance of a device performing a process of acquiring pseudonymous identification information can be performed independently for each communication protocol. This means that maintenance of the device performing a process of acquiring pseudonymous identification information can be performed easily.

As described above, according to the communication system 1, scalability with respect to addition of communication protocols can be improved, and maintenance of the device becomes easier.

Further, according to the first exemplary embodiment, each of the pseudonymous identification information acquiring devices (the first pseudonymous identification information acquiring device 300 and the second pseudonymous identification information acquiring device 400) generates pseudonymous identification information according to the mode indicated by the mode information. As such, pseudonymous identification information corresponding to each of the communication protocols can be generated according to the same mode.

Consequently, it is possible to prevent a case where, for example, even though different pseudonymous identification information is generated for a communication protocol each time communication session is established, pseudonymous identification information for another communication protocol is generated only when a communication session is established for the first time.

Further, according to the first exemplary embodiment, when the first communication relay device 500 and the second communication relay device 600 received communication information including pseudonymous identification information, the first communication relay device 500 and the second communication relay device 600 replace the pseudonymous identification information with terminal identification information associated with the pseudonymous identification information. Thereby, the destination terminal 100b transmits the communication information including the pseudonymous identification information as destination terminal identification information, so that the destination terminal 100b is able to transmit the communication information to the source terminal 100a.

It should be noted that the communication system 1 according to a variation of the first exemplary embodiment may be adapted to replace destination terminal identification information according to a communication protocol other than SIP or IP with pseudonymous identification information. Further, the communication system 1 may also be adapted to replace MAC (Media Access Control) address included in the Ethernet (registered trademark) with pseudonymous identification information.

It should be noted that in the first exemplary embodiment, although the first communication relay device 500 and the second communication relay device 600 are two independent server devices, they may be formed as one server device. Further, although the first pseudonymous identification information acquiring device 300 and the first communication relay device 500 are two independent server devices in the first exemplary embodiment, they may be formed as one server device. Similarly, although the second pseudonymous identification information acquiring device 400 and the second communication relay device 600 are two independent server devices, they may be formed as one server device.

Further, in the first exemplary embodiment, although the first pseudonymous identification information acquiring device 300 and the second pseudonymous identification information acquiring device 400 are adapted to use SIP-URI, including a random character string as a user name, as pseudonymous identification information for the first communication protocol, they may be adapted to use SIP-URI, including a random character string as a domain name, as pseudonymous identification information for the first communication protocol.

Further, the communication system 1 according to a variation of the first exemplary embodiment may use "*" which is information indicating arbitrary communication terminal as destination terminal identification information included in the basic rule information.

Further, the communication system 1 according to a variation of the first exemplary embodiment may have a plurality of communication relay devices which are identical to the first communication relay device 500. In that case, it is preferable that the source terminal 100a is adapted to select a communication relay device serving as the destination of the communication information according to the loads of the communication relay devices. Furthermore, the source terminal 100a may be adapted to select a communication relay device serving as the destination of the communication information according to the predetermined priority.

Further, in the first exemplary embodiment, although the second pseudonymous identification information acquiring device 400 is adapted to transmit rule information to both the first communication relay device 500 and the second communication relay device 600, it may be adapted to transmit the rule information only to the second communication relay device 600.

Further, in the first exemplary embodiment, although each of the pseudonymous identification information storing section 302 and the pseudonymous identification information storing section 402 is adapted to store the source terminal identification information and the pseudonymous identification information while associating them with each other, they may be adapted to store only pseudonymous identification information without associating it with the source terminal identification information. For example, when each of the first pseudonymous identification information acquiring device 300 and the second pseudonymous identification information acquiring device 400 is used by one user, the same actions and advantageous effects as those of the first exemplary embodiment can be achieved even with this configuration.

Further, in the first exemplary embodiment, although each of the pseudonymous identification information storing section 302 and the pseudonymous identification information storing section 402 are adapted to store the source terminal identification information and the pseudonymous identification information while associating them with each other, they may be adapted to associate the destination terminal identification information with the pseudonymous identification information and store them.

In that case, it is preferable that each of the first pseudonymous identification information acquiring device 300 and the second pseudonymous identification information acquiring device 400 is adapted to determine that pseudonymous identification information has been generated when the pseudonymous identification information is stored in association with destination terminal identification information which is identical to the destination terminal identification information acquired based on the received basic rule information.

According to this configuration, pseudonymous identification information can be changed according to the destination terminal. For example, when the pseudonymous identification information storing section 302 stores "sip:vid999@nec.com" as pseudonym identification information while associating it with "sip:bob@nec.com" as destination terminal identification information, if "sip:claire@nec.com" as destination terminal identification information is acquired, the first pseudonymous identification information acquiring device 300 determines that the result is "No" at step 1610 and can generate new pseudonymous identification information.

Second Exemplary Embodiment

Next, a communication system according to a second exemplary embodiment of the present invention will be described. The communication system according to the second exemplary embodiment differs from the communication system according to the first exemplary embodiment in having a plurality of pseudonymous identification information acquiring devices associated with one communication protocol. As such, description will be Oven below mainly for this difference.

Figure 19:
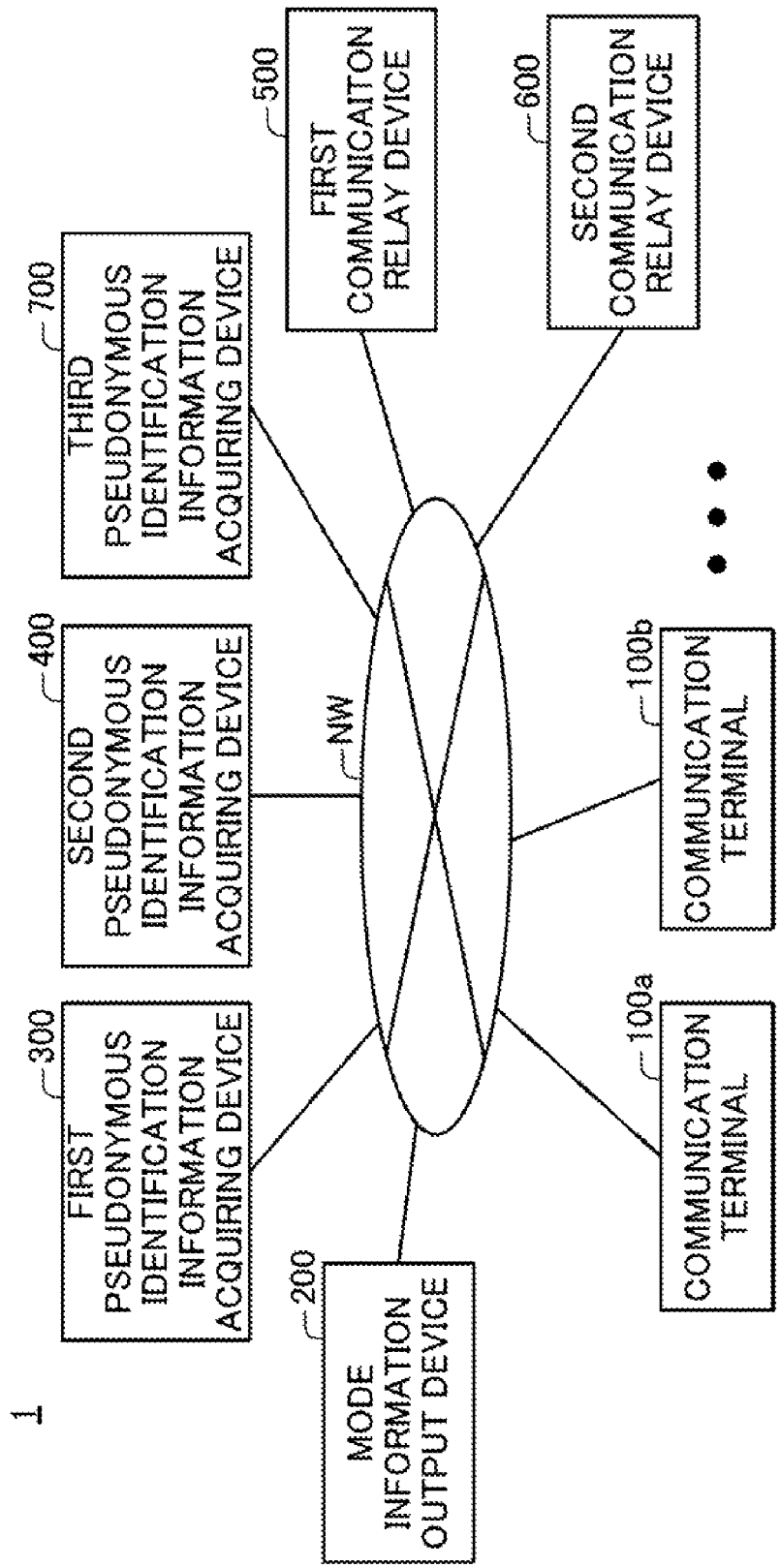
FIG. 19 is a diagram showing the schematic configuration of a communication system according to a second exemplary embodiment of the present invention.

As shown in FIG. 19, a communication system 1 according to the second exemplary embodiment includes a third pseudonymous identification information acquiring device 700, in addition to the configuration of the communication system 1 of the first exemplary embodiment. The third pseudonymous identification information acquiring device 700 has a similar configuration to that of the first pseudonymous identification information acquiring device 300.

Figure 20:
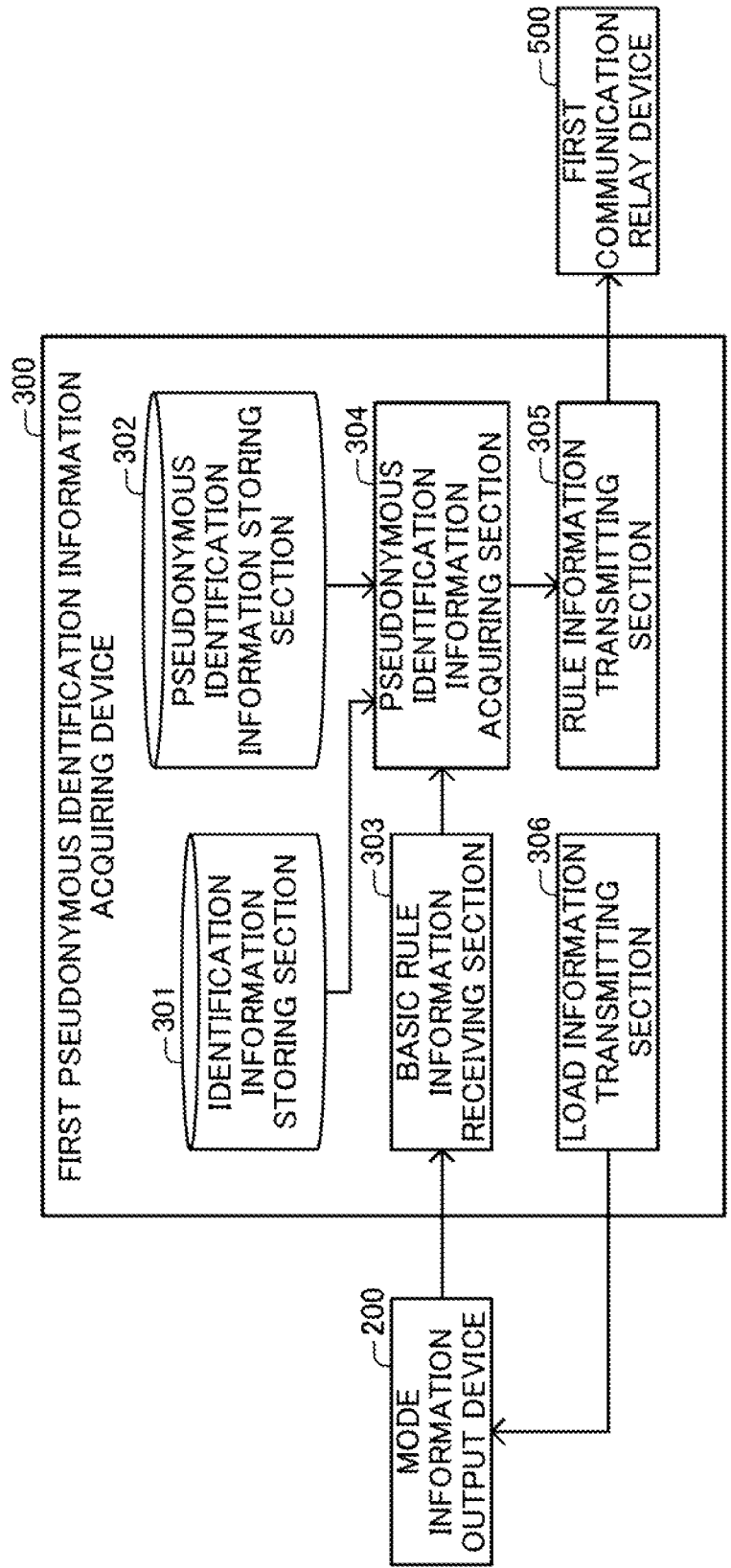
FIG. 20 is a block diagram showing the functional overview of a first pseudonymous identification information acquiring device according to the second exemplary embodiment of the present invention.

Further, as shown in FIG. 20, functions of the first pseudonymous identification information acquiring device 300 includes a load information transmitting section (load acquiring unit) 306, in addition to the functions of the first pseudonymous identification information acquiring device 300 of the first exemplary embodiment.

The load information transmitting section 306 acquires load information indicating the load of the first pseudonymous identification information acquiring device 300 each time a preset acquisition cycle elapses. The load information indicates a CPU availability (CPU utilization) which is a ratio of an actual value to the upper limit value of the number of operations performed by the CPU in a time unit. It should be noted that the load information may be information indicating the amount of data stored in the memory (used capacity of the memory) or memory utilization which is a ratio of "the amount of stored data" to the "total capacity" of the memory.

When the load information is acquired, the load information transmitting section 306 transmits the acquired load information to the mode information output device 200.

The functions of the third pseudonymous identification information acquiring device 700 also include a load information transmitting section which is similar to that of the load information transmitting section 306.

Figure 21:
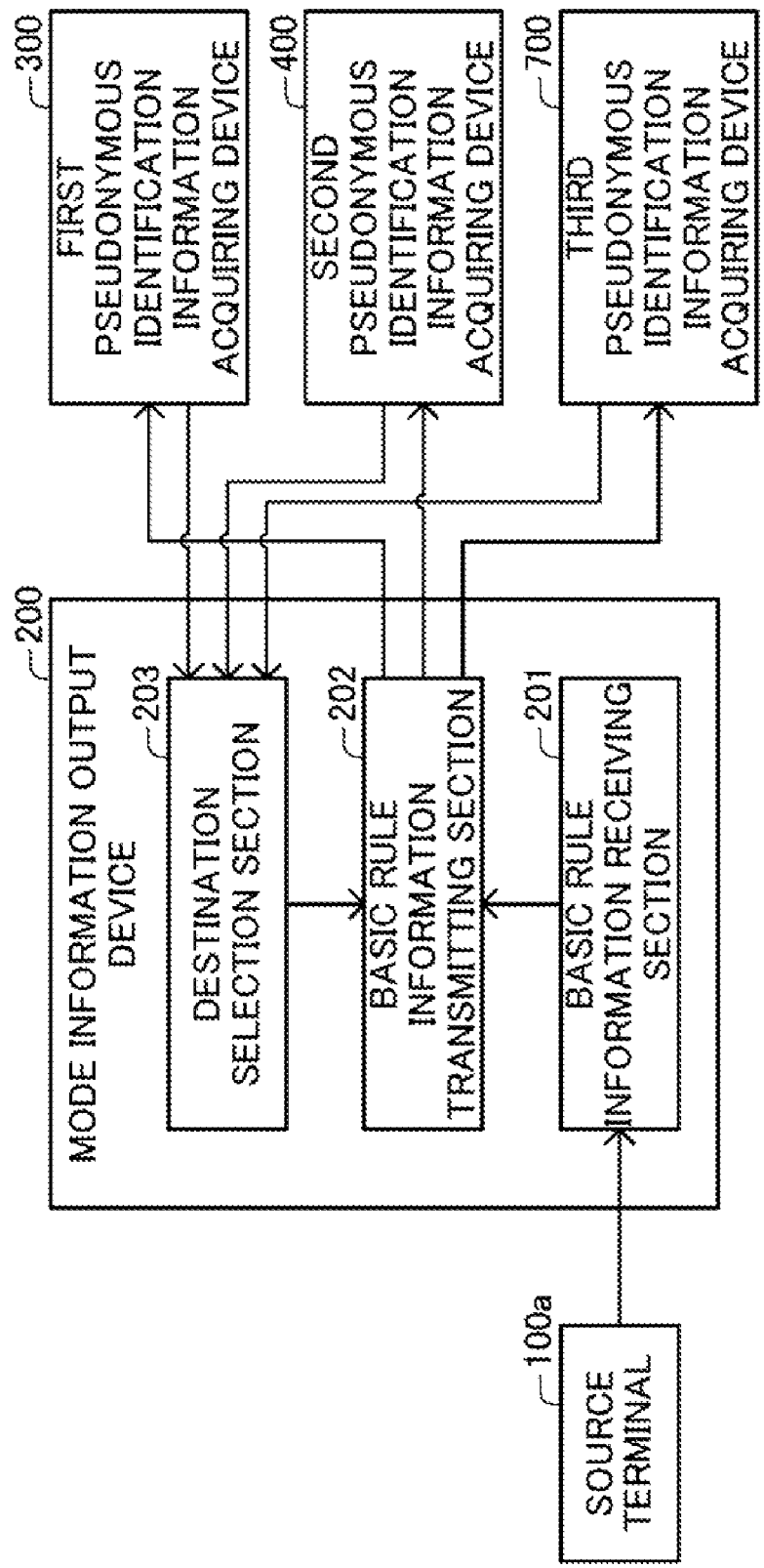
FIG. 21 is a block diagram showing the functional overview of a mode information output device according to the second exemplary embodiment of the present invention.

Further, as shown in FIG. 21, the functions of the mode information output device 200 include, in addition to the functions of the mode information output device 200 according to the first exemplary embodiment, a destination selection section (mode information output unit) 203.

The destination selection section 203 receives load information transmitted from the first pseudonymous identification information acquiring device 300 and the third pseudonymous identification information acquiring device 700.

Then, the destination selection section 203 selects a pseudonymous identification information acquiring device (first pseudonymous identification information acquiring device 300 or the third pseudonymous identification information acquiring device 700) in which the load indicated by the received load information is the smallest.

The basic rule information transmitting section 202 transmits the basic rule information received by the basic rule information receiving section 201 to the pseudonymous identification information acquiring device selected by the destination selection section 203 and to the second pseudonymous identification information acquiring device 400, respectively.

By means of the communication system 1 according to the second exemplary embodiment, similar actions and advantageous effects to those of the communication system 1 according to the first exemplary embodiment can also be achieved.

Further, according to the communication system 1 of the second exemplary embodiment, it is possible to acquire pseudonymous identification information using the acquired pseudonymous identification information acquiring device in which the load is smaller. As a result, it is possible to prevent the load of each pseudonymous identification information acquiring device from becoming excessive.

It should be noted that in the second exemplary embodiment, although the destination selection section 203 is adapted to select a pseudonymous identification information acquiring device serving as the destination of the basic rule information based on the loads of a plurality of pseudonymous identification information acquiring devices, the destination selection section 203 may be adapted to select a pseudonymous identification information acquiring device serving as the destination of the basic rule information based on the mode indicated by the mode information.

In that case, it is preferable that the first pseudonymous identification information acquiring device 300 is adapted to generate pseudonymous identification information only by the first mode, and the third pseudonymous identification information acquiring device 700 is adapted to generate pseudonymous identification information only by the second mode.

Accordingly, the destination selection section 203 selects the first pseudonymous identification information acquiring device 300 as the destination of the basic rule information if the mode indicated by the mode information is the first mode, while selects the third pseudonymous identification information acquiring device 700 as the destination of the basic rule information if the mode indicated by the mode information is the second mode.

It should be noted that the process load, the required storage capacity, and the like differ depending on the mode for generating pseudonymous identification information. As such, by constituting the communication system 1 as described above, pseudonymous identification information can be acquired by using a pseudonymous identification information acquiring device which is optimum for the mode indicated by the received mode information.

Third Exemplary Embodiment

Next, a communication system according to a third exemplary embodiment of the present invention will be described. The communication system according to the third exemplary embodiment differs from the communication system of the first exemplary embodiment in that when the mode information output device 200 receives mode information indicating the second mode, transmits mode information indicating the first mode to the second pseudonymous identification information acquiring device 400. As such, description will be given below mainly for this difference.

Figure 22:
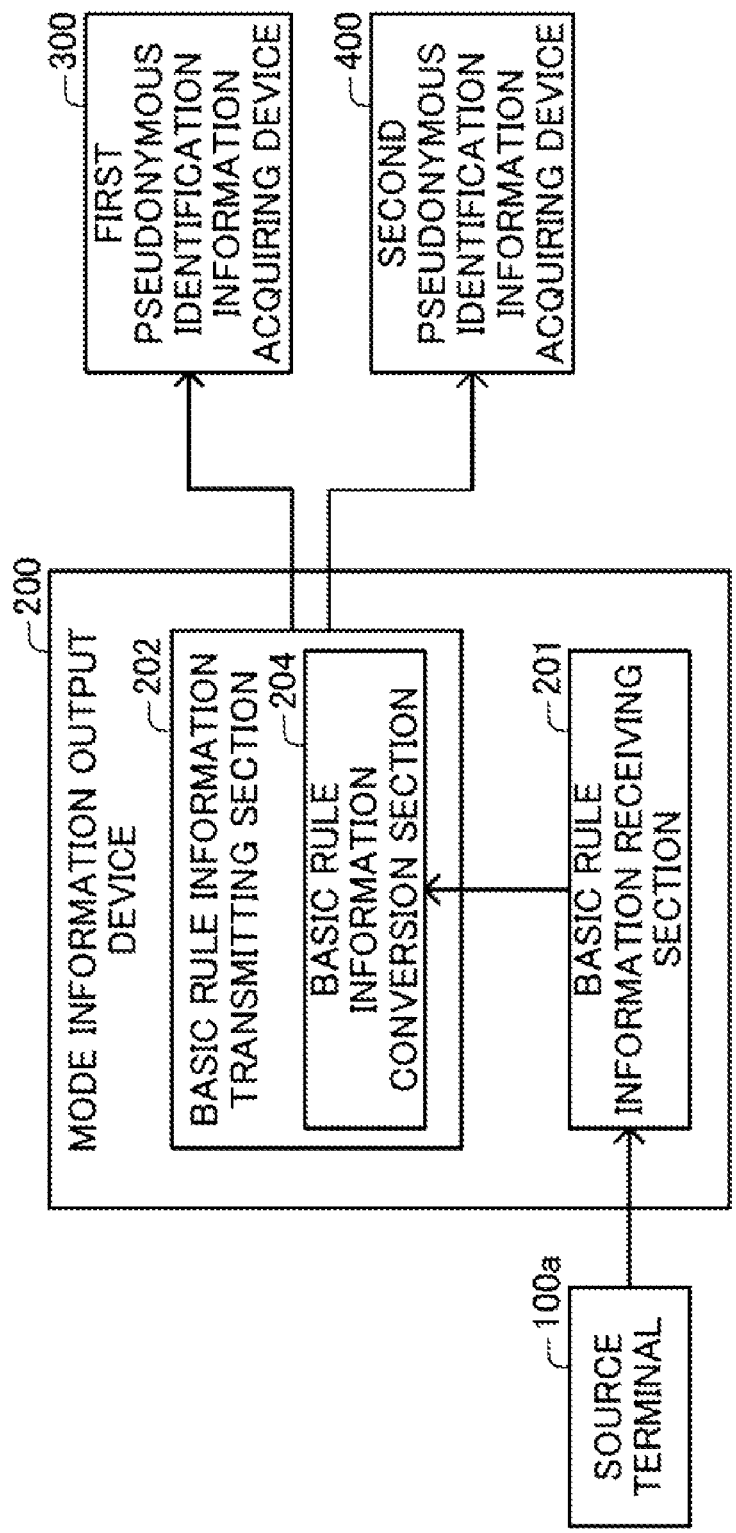
FIG. 22 is a block diagram showing the functional overview of a mode information output device according to a third exemplary embodiment of the present invention.

As shown in FIG. 22, the basic rule information transmitting section 202 according to the third exemplary embodiment includes basic rule information conversion section 204.

When the mode information included in the basic rule information received by the basic rule information receiving section 201 is the second mode, the basic rule information conversion section 204 outputs basic rule information in which the mode information included in the basic rule information is replaced with the mode information indicating the first mode.

If the mode information included in the basic rule information received by the basic rule information receiving section 201 is the first mode, the basic rule information transmitting section 202 transmits the basic rule information to the first pseudonymous identification information acquiring device 300 and the second pseudonymous identification information acquiring device 400, respectively.

Further, if the mode information included in the basic rule information received by the basic rule information receiving section 201 is the second mode, the basic rule information transmitting section 202 transmits the basic rule information to the first pseudonymous identification information acquiring device 300. In that case, the basic rule information transmitting section 202 transmits the basic rule information output from the basic rule information conversion section 204 (namely, basic rule information including mode information indicating the first mode) to the second pseudonymous identification information acquiring device 400.

As described above, if the mode indicated by the received mode information is the second mode, the mode information output device 200 according to the third exemplary embodiment transmits the mode information indicating the second mode to the first pseudonymous identification information acquiring device 300, and also transmits the mode information indicating the first mode to the second pseudonymous identification information acquiring device 400.

It should be noted that source terminal identification information included in the communication information transmitted according to a communication protocol located closer to the application layer side (that is, opposite to the physical layer side) is likely to be referred to by a user of the communication terminal which receives the communication information.

As such, in the case where pseudonymous identification information is generated in accordance with the second mode with respect to the first communication protocol (in this example, SIP), the user of the destination terminal 100*b* can recognize the source terminal 100*a* as the identical communication terminal by referring to the pseudonymous identification information included in the communication information according to the SIP throughout the communication sessions.

In that case, it is less likely that the user of the destination terminal 100*b* refers to the pseudonymous identification information included in the communication information according to the second communication protocol (in this example, IP). As such, even if the pseudonymous identification information included in the communication information according to IP differs for each communication session, the user of the destination terminal 100*b* can recognize the source terminal 100*a* as the identical communication terminal throughout the communication sessions.

As described above, by configuring the communication system 1 as described above, it is possible to allow the user of the destination terminal 100*b* to recognize the source terminal 100*a* as the identical communication terminal throughout the communication sessions, while generating the pseudonymous identification information according to the first mode with respect to the second communication protocol (in this example, IP).

Further, the mode information output device 200 according to a variation of the third exemplary embodiment may be adapted to transmit basic rule information including mode information for instructing selection of either the first mode or the second mode to the second pseudonymous identification information acquiring device 400, when receiving mode information indicating the second mode.

In that case, when the second pseudonymous identification information acquiring device 400 receives the basic rule information, it is preferable to select the second mode if the amount of data stored in the memory is larger than a predetermined value, and select the first mode if the amount is smaller than the predetermined value, from the first mode and the second mode. Thereby, a process can be performed in accordance with the load information of the second pseudonymous identification information acquiring device 400.

Fourth Exemplary Embodiment

Next, a communication system according to the fourth exemplary embodiment of the present invention will be described. The communication system according to the fourth exemplary embodiment differs from the communication system of the first exemplary embodiment in that when terminal identification information for identifying the communication terminal has been changed, the terminal identification information stored in the pseudonymous identification information acquiring device is updated. As such, description will be given below mainly for this difference.

Figure 23:
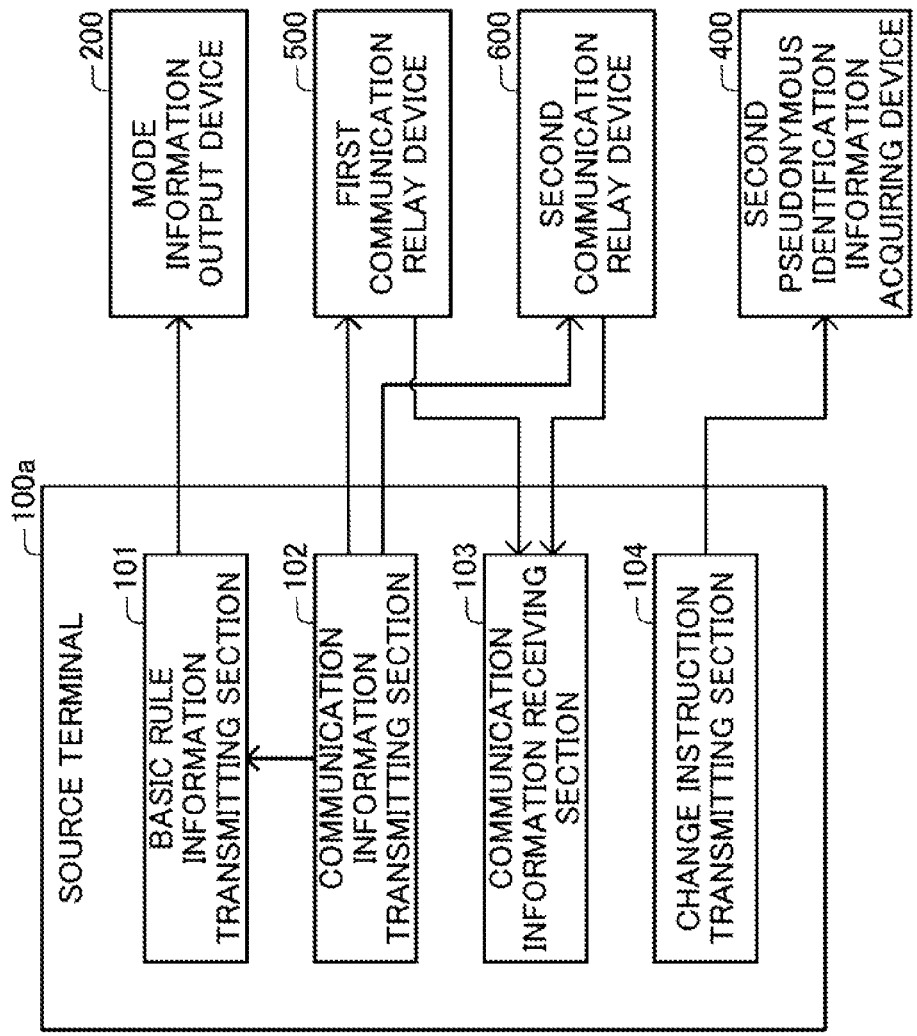
FIG. 23 is a block diagram showing the functional overview of a source terminal according to a fourth exemplary embodiment of the present invention.
Figure 24:
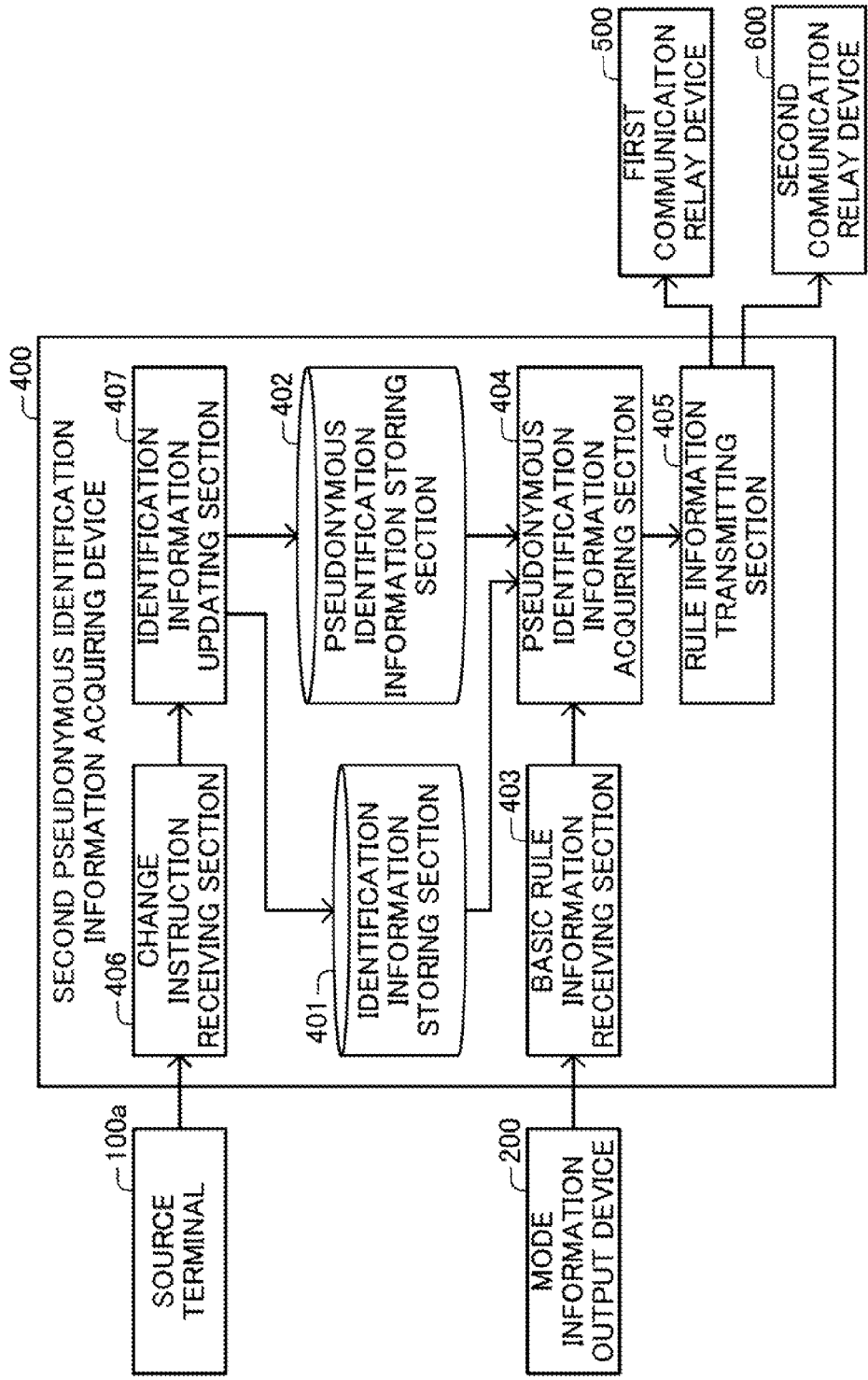
FIG. 24 is a block diagram showing the functional overview of a second pseudonymous identification information acquiring device according to the fourth exemplary embodiment of the present invention.

As shown in FIG. 23, the functions of the source terminal 100*a* according to the fourth exemplary embodiment include a change instruction transmitting section 104, in addition to the functions of the source terminal 100*a* of the first exemplary embodiment.

The change instruction transmitting section 104 is adapted such that when the terminal identification information (namely, IP address of the source terminal 100*a*) for identifying the source terminal 100*a* according to the second communication protocol has been changed, the change instruction transmitting section 104 transmits a terminal identification information change instruction including user identification information for identifying the user of the source terminal 100*a*, terminal identification information before change, and terminal identification information after change, to the second pseudonymous identification information acquiring device 400.

In this example, it is assumed that the IP address of the source terminal 100*a* has been changed from "192.168.1.1" to "192.168.3.3". In this case, the source terminal 100*a* transmits a terminal identification information change instruction including information indicating "Alice" as the user identification information, information indicating "192.168.1.1" as terminal identification information before the change, and information indicating "192.168.3.3" as the terminal identification information after the change.

Further, the functions of the second pseudonymous identification information acquiring device 400 according to the fourth exemplary embodiment include a change instruction receiving section (terminal identification information change instruction accepting unit) 406 and an identification information updating section (identification information updating unit) 407, in addition to the functions of the second pseudonymous identification information acquiring device 400 according to the first exemplary embodiment.

The change instruction receiving section 406 receives (accepts) terminal identification information change instruction transmitted from the source terminal 100a.

When the change instruction receiving section 406 receives the terminal identification information change instruction, the identification information updating section 407 updates the terminal identification information (in this example, information indicating "192.168.1.1") stored in the identification information storing section 401 in association with the user identification information (in this example, "Alice") included in the terminal identification information change instruction, to the terminal identification information after the change (in this example, information indicating "192.168.3.3") included in the terminal identification information change instruction.

Further, when the change instruction receiving section 406 receives the terminal identification information change instruction, the identification information updating section 407 updates source terminal identification information which is identical to the terminal identification information before the change (in this example, in formation indicating "192.168.1.1") included in the received terminal identification information change instruction of the source terminal identification information stored in the pseudonymous identification information storing section 402, to the terminal identification information after the change ("in this example, information indicating "192.168.3.3") included in the terminal identification information change instruction.

In this way, when the terminal identification information change instruction is accepted, the second pseudonymous identification information acquiring device 400 updates the source terminal identification information associated with the pseudonymous identification information to the terminal identification information after the change included in the terminal identification information change instruction.

According to the communication system 1 of the fourth exemplary embodiment, even if the terminal identification information (in this example, IP address) of the source terminal 100a has been changed, the source terminal 100a can transmit the communication information to the destination terminal 100b while preventing the source terminal 100a from being specified.

Further, even if the terminal identification information of the source terminal 100a has been changed, the pseudonymous identification information set to the source terminal 100a can be maintained. As such, if the pseudonymous identification information is acquired according to the second mode, the destination terminal 100b can recognize the source terminal 100a as the identical communication terminal throughout the communication sessions. As a result, when the source terminal 100a performs loaming, the loaming cannot be recognized by the destination terminal 100b.

Fifth Exemplary Embodiment

Figure 25:
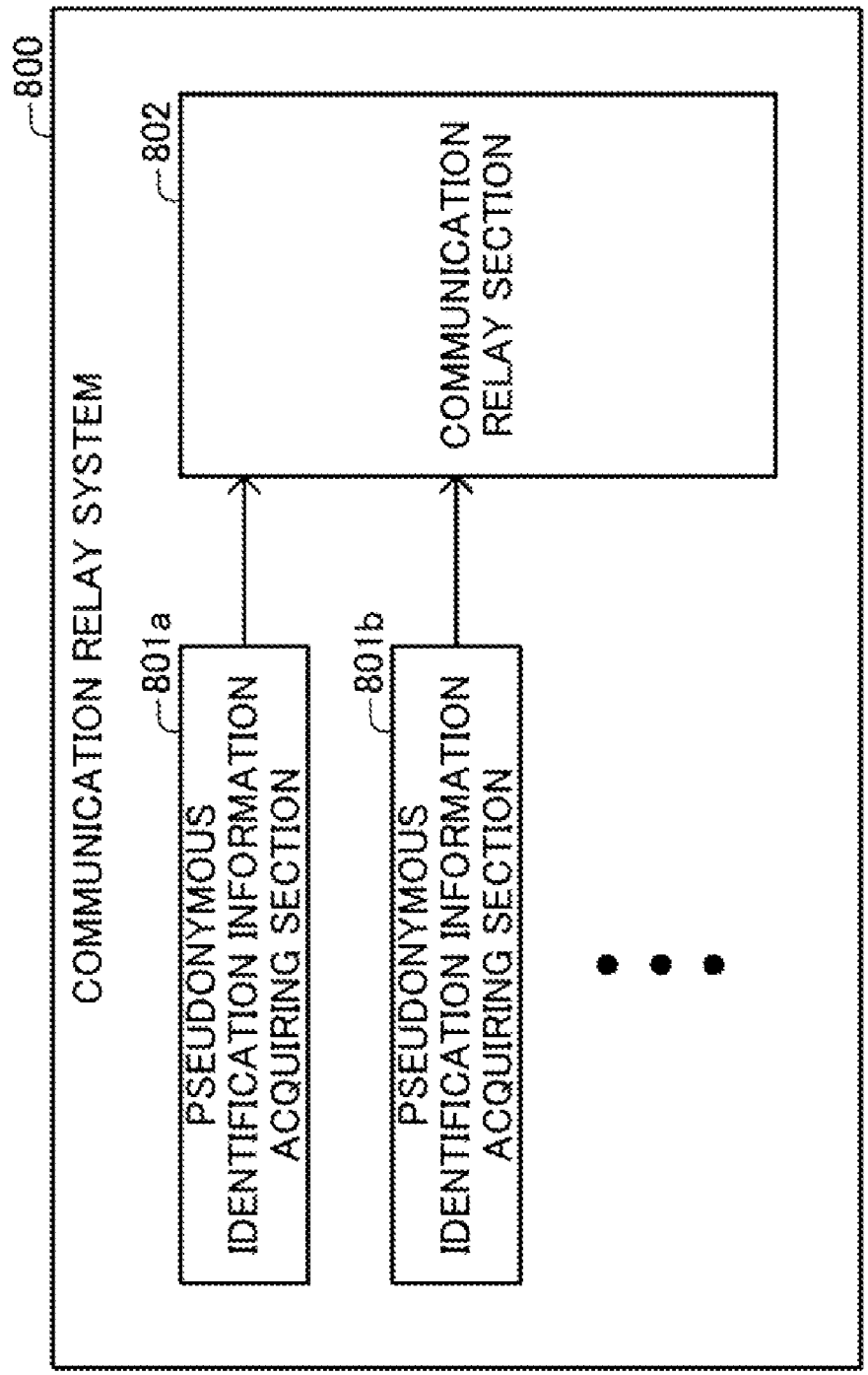
FIG. 25 is a block diagram showing the functional overview of a communication relay system according to a fifth embodiment of the present invention.

Next, a communication relay system according to a fifth exemplary embodiment of the present invention will be described with reference to FIG. 25.

The communication relay system 800 according to the fifth exemplary embodiment is a system for relaying communications performed between a plurality of communication terminals according to a plurality of communication protocols.

The communication relay system 800 includes, for each of the communication protocols, at least one pseudonymous identification information acquiring section (pseudonymous identification information acquiring unit) 801a, 801b, . . . associated with each communication protocol.

Each of the pseudonymous identification information acquiring sections 801a, 801b, . . . is adapted to acquire pseudonymous identification information which is information according to the communication protocol associated with the pseudonymous identification information acquiring section and is different from terminal identification information for identifying each of the communication terminals.

The communication relay system 800 also includes a communication relay section (communication relay unit) 802 which, when receiving communication information according to at least one of the communication protocols from a source terminal among the communication terminals, replaces the source terminal identification information which is included in the communication information and is the terminal identification information for identifying the source terminal as the communication terminal serving as the source of the communication information, with the pseudonymous identification information acquired by the pseudonymous identification information acquiring unit, and transmits the communication information after the replacement to a destination terminal which is another one of the communication terminals.

According to this configuration, when a new communication protocol is added to the communications performed between a plurality of communication terminals, by adding a pseudonymous identification information acquiring unit associated with the added communication protocol, a process of acquiring pseudonymous identification information can be performed even for this communication protocol.

Further, according to this configuration, maintenance of a device performing a process of acquiring pseudonymous identification information can be performed independently for each communication protocol. This means that maintenance of the device performing a process of acquiring pseudonymous identification information can be performed easily.

As described above, according to the communication relay system 800, scalability with respect to addition of communication protocols can be improved, and maintenance of the device becomes easier.

While the invention has been particularly shown and described with reference to the exemplary embodiments thereof, the invention is not limited to these embodiments. It will be understood by those of ordinary skill in the art that various changes in form and details may be made therein without departing from the spirit and scope of the present invention as defined by the claims.

For example, although the communication terminal is an IP telephone in the above description, it may be a personal computer, a mobile telephone, a PHS (Personal Handyphone System), a PDA (Personal Data Assistance, Personal Digital Assistant), a terminal for car navigation system, a terminal for playing games, or the like.

Further, in the above exemplary embodiments, although the communication system 1 uses SIP, IP and RTP as communication protocols, the communication system 1 may be adapted to use other communication protocols (HTTP (HyperText Transfer Protocol), communication protocols for transmitting and receiving e-mails and short messages, and the like).

Further, in the above exemplary embodiments, although the system is configured to transmit basic rule information from the source terminal 100a to the mode information output device 200, it is also acceptable to transmit basic rule information from a device other than the source terminal 100a to the mode information output device 200. Further, the mode information output device 200 may be adapted to accept input of basic rule information.

Further, in the above exemplary embodiments, although the basic rule information includes source user identification information, destination user identification information, and mode information, the basic rule information may consist of source user identification information and mode information.

Further, in the above exemplary embodiments, although the respective functions of the communication system 1 are realized by the CPU executing the programs (software), they may be realized by hardware such as circuits.

Further, in the above exemplary embodiments, although the programs are stored in storage devices, they may be stored in computer readable media. For example, recording media are portable media including flexible disks, optical disks, magneto optical disks, and semiconductor memories.

Further, as other variations of the above exemplary embodiments, any combinations of the above-described exemplary embodiments and the variations may be adopted.

The present invention is applicable to a communication relay systems for relaying communications performed between IP telephones.

<Supplementary Note>

The whole or part of the exemplary embodiments disclosed above can be described as, but not limited to, the following supplementary notes.

(Supplementary Note 1)

A communication relay system for relaying communications performed between a plurality of communication terminals according to a plurality of communication protocols, the system comprising:

at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals; and a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by the pseudonymous identification information acquiring unit, and transmits the communication information after replacement to a destination terminal which is another one of the communication terminals.

According to this configuration, when a new communication protocol is added to the communications performed between a plurality of communication terminals, by adding a pseudonymous identification information acquiring unit associated with the added communication protocol, a process of acquiring pseudonymous identification information can be performed even for this communication protocol.

Further, according to this configuration, maintenance of a unit performing a process of acquiring pseudonymous identification information can be performed independently for each communication protocol. This means that maintenance of the unit performing a process of acquiring pseudonymous identification information can be performed easily.

As described above, according to this communication relay system, scalability with respect to addition of communication protocols can be improved, and maintenance becomes easier.

(Supplementary Note 2)

The communication relay system according to Supplementary note 1, wherein the pseudonymous identification information acquiring unit acquires the pseudonymous identification information in association with the source terminal identification information, and when the communication relay unit receives the communication information from the source terminal, the communication relay unit replaces the source terminal identification information included in the communication information with the pseudonymous identification information acquired by the pseudonymous identification information acquiring unit in association with the source terminal identification information, and transmits the communication information after replacement to the destination terminal.

(Supplementary Note 3)

The communication relay system according to Supplementary note 1 or 2, further comprising;

a mode information output unit which accepts mode information indicating a mode for generating the pseudonymous identification information, and outputs the accepted mode information to each of the pseudonymous identification information acquiring units.

According to this configuration, each of the pseudonymous identification information acquiring units generates pseudonymous identification information according to the mode indicated by the mode information. As such, pseudonymous identification information corresponding to each of the communication protocols can be generated according to the same mode, for example.

(Supplementary Note 4)

The communication relay system according to Supplementary note 3, wherein the mode information is information indicating either a first mode in which different pseudonymous identification information is generated each time a communication session is established, or a second mode in which pseudonymous identification information is generated only when a communication session is established for the first time.

(Supplementary Note 5)

The communication relay system according to Supplementary note 3 or 4, wherein the pseudonymous identification information acquiring unit acquires pseudonymous identification information by generating the pseudonymous identification information according to the mode indicated by the mode information output from the mode information output unit.

According to this configuration, pseudonymous identification information with respect to each of the communication protocols can be generated according to the same mode. Consequently, it is possible to prevent a case where, for example, even though different pseudonymous identification information is generated for a communication protocol each time communication session is established, pseudonymous identification information for another communication protocol is generated only when a communication session is established for the first time.

(Supplementary Note 6)

The communication relay system according to Supplementary note 4, wherein the plurality of communication protocols include a first communication protocol, and a second communication protocol which locates on a physical layer side from the first communication protocol in an OSI (Open Systems Interconnection) reference model, the plurality of pseudonymous identification information acquiring units include a first pseudonymous identification information acquiring unit associated with the first communication protocol, and a second pseudonymous identification information acquiring unit associated with the second communication protocol, and when the mode indicated by the mode information accepted by the mode information output unit is the second mode, the mode information output unit outputs mode information indicating the second mode to the first pseudonymous identification information acquiring unit, and also outputs mode information indicating the first mode to the second pseudonymous identification information acquiring unit.

It should be noted that source terminal identification information included in the communication information transmitted according to a communication protocol located closer to the application layer side (that is, opposite to the physical layer side) is likely to be referred to by a user of the communication terminal which receives the communication information.

Now, it is assumed that when the first communication protocol is located on the application layer side from the second communication protocol in the OSI reference model, pseudonymous identification information is generated according to the second mode with respect to the first communication protocol. In this case, the user of the destination terminal can recognize the source terminal as the identical communication terminal by referring to the pseudonymous identification information included in the communication information according to the first communication protocol throughout a plurality of communication sessions.

In that case, it is less likely that the user of the destination terminal refers to the pseudonymous identification information included in the communication information according to the second communication protocol. As such, even if the pseudonymous identification information included in the communication information according to IP differs for each communication session, the user of the destination terminal can recognize the source terminal as the identical communication terminal throughout the communication sessions.

As such, by configuring the communication relay system as described above, it is possible to allow the user of the destination terminal to recognize the source terminal as the identical communication terminal throughout the communication sessions, while generating the pseudonymous identification information according to the first mode with respect to the second communication protocol.

(Supplementary Note 7)

The communication relay system according to any one of Supplementary notes 3 to 6, wherein the mode information output unit accepts the mode information and user identification information for identifying a user of the source terminal, and outputs the accepted mode information and the user identification information to each of the pseudonymous identification information acquiring units, the pseudonymous identification information acquiring unit includes an identification information storing unit which stores user identification information for identifying a user and terminal identification information which is information according to a communication protocol associated with the pseudonymous identification information acquiring unit and for identifying the communication terminal, in association with each other, and the pseudonymous identification information acquiring unit acquires the terminal identification information stored in association with the user identification information output from the mode information output unit, as the source terminal identification information.

(Supplementary Note 8)

The communication relay system according to Supplementary note 7, wherein the mode information output unit accepts the mode information, source user identification information for identifying the user of the source terminal, and destination user identification information for identifying the user of the destination terminal, and outputs the mode information, the source user identification information, and the destination user identification information, which have been accepted, to each of the pseudonymous identification information acquiring units, the pseudonymous identification information acquiring unit acquires terminal identification information stored in association with the source user identification information output from the mode information output unit, as the source terminal identification information, and acquires terminal identification information stored in association with the destination user identification information output from the mode information output unit, as the destination terminal identification information, and when the communication relay unit receives the communication information including the source terminal identification information and the destination terminal identification information acquired by the pseudonymous identification information acquiring unit, the communication relay unit replaces the source terminal identification information included in the communication information with the pseudonymous identification information acquired in association with the source terminal identification information.

(Supplementary Note 9)

The communication relay system according to Supplementary note 8, wherein the communication relay unit includes a pseudonymous identification information storing unit which stores the source terminal identification information and the pseudonymous identification information acquired in association with the source terminal identification information, in association with each other, and if destination terminal identification information for identifying the communication terminal serving as a destination, included in the received communication information, conforms with the stored pseudonymous identification information, the communication relay unit replaces the destination terminal identification information with the source terminal identification information stored in association with the pseudonymous identification information, and transmits the communication information after replacement to the communication terminal identified by the source terminal identification information.

It is assumed that when communication information is transmitted from a first communication terminal to a second communication terminal, terminal identification information for identifying the first communication terminal included as source terminal identification information in the communication information is replaced with pseudonymous identification information. According to the above-described configuration, even in that case, the second communication terminal can transmit the communication information to the first communication terminal by transmitting the communication information including the pseudonymous identification information as destination terminal identification information.

(Supplementary Note 10)

The communication relay system according to any one of Supplementary notes 3 to 9, wherein the plurality of pseudonymous identification information acquiring units include a plurality of pseudonymous identification information acquiring units associated with one of the plurality of communication protocols, the communication relay system further includes a load acquiring unit which acquires a load of each of the pseudonymous identification information acquiring units associated with the one of the plurality of communication protocols, and the mode information output unit selects one of the plurality of pseudonymous identification information acquiring units associated with the one of the plurality of communication protocols based on the acquired loads, and outputs the accepted mode information to the selected pseudonymous identification information acquiring unit.

According to this configuration, it is possible to acquire pseudonymous identification information using the acquired pseudonymous identification information acquiring device in which the load is smaller. As a result, it is possible to prevent the load of each pseudonymous identification information acquiring device from becoming excessive.

(Supplementary Note 11)

The communication relay system according to any one of Supplementary notes 3 to 9, wherein the plurality of pseudonymous identification information acquiring units include a plurality of pseudonymous identification information acquiring units associated with one of the communication protocols, and the mode information output unit selects one of the plurality of pseudonymous identification information acquiring units associated with the one of the plurality of communication protocols based on the mode indicated by the accepted mode information, and outputs the accepted mode information to the selected pseudonymous identification information acquiring unit.

According to this configuration, pseudonymous identification information can be acquired by using a pseudonymous identification information acquiring unit which is optimum for the mode indicated by the received mode information.

(Supplementary Note 12)

The communication relay system according to any one of Supplementary notes 7 to 11, further comprising:

a terminal identification information change instruction accepting unit which, when the terminal identification information for identifying the communication terminal has been changed, accepts a terminal identification information change instruction including user identification information for identifying the user of the communication terminal and the terminal identification information after the change; and an identification information updating unit which, when the terminal identification information change instruction has been accepted, updates the terminal identification information stored in the identification information storing unit in association with the user identification information included in the terminal identification information change instruction, to the terminal identification information after the change included in the terminal identification information change instruction, wherein when the terminal identification information change instruction is accepted, the pseudonymous identification information acquiring unit updates the source terminal identification information associated with the acquired pseudonymous identification information to the terminal identification information after the change included in the terminal identification information change instruction.

According to this configuration, even if the terminal identification information of the source terminal has been changed, the source terminal can transmit the communication information to the destination terminal while preventing the source terminal from being specified.

(Supplementary Note 13)

The communication relay system according to any one of Supplementary notes 1 to 12, wherein the plurality of communication protocols include SIP (Session Initiation Protocol) and IP (Internet Protocol).

(Supplementary Note 14)

A communication relay method applied to a communication relay system adapted to relay communications performed between a plurality of communication terminals according to a plurality of communication protocols, and including at least one pseudonymous identification information acquiring unit associated with each of the plurality of communication protocols, the method comprising:

acquiring, by the pseudonymous identification information acquiring unit, pseudonymous identification information which is information according to the communication protocol associated with the pseudonymous identification information acquiring unit and is different from terminal identification information for identifying each of the communication terminals; and when receiving communication information according to at least one of the plurality of communication protocols from a source terminal which is one of the communication terminals, replacing source terminal identification information which is included in the communication information and is the terminal identification information for identifying the source terminal as the communication terminal serving as a source of the communication information with the pseudonymous identification information acquired by the pseudonymous identification information acquiring unit, and transmitting the communication information after replacement to a destination terminal which is another one of the communication terminals.

(Supplementary Note 15)

The communication relay method according to Supplementary note 14, further comprising:

acquiring, by the pseudonymous identification information acquiring unit, the pseudonymous identification information in association with the source terminal identification information, and when receiving the communication information from the source terminal, replacing the source terminal identification information included in the communication information with the pseudonymous identification information acquired by the pseudonymous identification information acquiring unit in association with the source terminal identification information, and transmitting the communication information after replacement to the destination terminal.

(Supplementary Note 16)

The communication relay method according to Supplementary note 14 or 15, further comprising:

accepting mode information indicating a mode for generating the pseudonymous identification information, and outputting the accepted mode information to each of the pseudonymous identification information acquiring units.

(Supplementary Note 17)

A communication system comprising:

a plurality of communication terminals which perform communications according to a plurality of communication protocols; and a communication relay system for relaying the communications performed between the plurality of communication terminals, wherein a source terminal, which is one of the communication terminals, is adapted to transmit communication information which is communication information according to at least one of the communication protocols, and includes source terminal identification information which is terminal identification information for identifying the source terminal as one of the communication terminals serving as a source of the communication information, and destination terminal identification information which is terminal identification information for identifying a destination terminal as another one of the communication terminals serving as a destination of the communication information, and the communication relay system includes:

at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals; and a communication relay unit which, when receiving the communication information from the source terminal, replaces source terminal identification information which is included in the communication information and is the terminal identification information for identifying the source terminal as the communication terminal serving as the source of the communication information, with the pseudonymous identification information acquired by the pseudonymous identification information acquiring unit, and transmits the communication information after replacement to the destination terminal.

(Supplementary Note 18)

The communication system according to Supplementary note 17, wherein the pseudonymous identification information acquiring unit acquires the pseudonymous identification information in association with the source terminal identification information, and when the communication relay unit receives the communication information from the source terminal, the communication relay unit replaces the source terminal identification information included in the communication information with the pseudonymous identification information acquired by the pseudonymous identification information acquiring unit in association with the source terminal identification information, and transmits the communication information after replacement to the destination terminal.

(Supplementary Note 19)

The communication system according to Supplementary note 17 or 18, wherein the communication relay system includes a mode information output unit which accepts mode information indicating a mode for generating the pseudonymous identification information, and outputs the accepted mode information to each of the pseudonymous identification information acquiring units.

(Supplementary Note 20)

A pseudonymous identification information acquiring device, comprising:

a pseudonymous identification information acquiring unit which acquires pseudonymous identification information which is information according to a predetermined communication protocol and is different from terminal identification information for identifying a communication terminal.

(Supplementary Note 21)

The pseudonymous identification information acquiring device according to Supplementary note 20, wherein the pseudonymous identification information acquiring unit acquires the pseudonymous identification information in association with source terminal identification information which is the terminal identification information included in communication information, transmitted from the communication terminal and according to the communication protocol, and is the terminal identification information for identifying a source terminal as the communication terminal serving as a source of the communication information.

(Supplementary Note 22)

A computer program product comprising computer implementable instructions for causing an information processor to realize a pseudonymous identification information acquiring unit which acquires pseudonymous identification information which is information according to a predetermined communication protocol and is different from terminal identification information for identifying a communication terminal.

(Supplementary Note 23)

The computer program product according to Supplementary note 22, wherein the pseudonymous identification information acquiring unit acquires the pseudonymous identification information in association with source terminal identification information which is the terminal identification information included in communication information, transmitted from the communication terminal and according to the communication protocol, and is the terminal identification information for identifying a source terminal as the communication terminal serving as a source of the communication information.

(Supplementary Note 24)

A communication relay device adapted to relay communications performed between a plurality of communication terminals according to a plurality of communication protocols, the device comprising:

a pseudonymous identification information receiving unit which receives pseudonymous identification information which is information according to each of the communication protocols and is information different from terminal identification information for identifying each of the communication terminals; and a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the received pseudonymous identification information, and transmits the communication information after replacement to a destination terminal which is another one of the communication terminals.

(Supplementary Note 25)

The communication relay device according to Supplementary note 24, wherein the pseudonymous identification information receiving unit receives the source terminal identification information and the pseudonymous identification information associated with the source terminal identification information, and when the communication relay unit receives the communication information from the source terminal, the communication relay unit replaces the source terminal identification information included in the communication information with the pseudonymous identification information received in association with the source terminal identification information, and transmits the communication information after replacement to the destination terminal.

(Supplementary Note 26)

A computer program product comprising computer implementable instructions for causing an information processor, adapted to relay communications performed between a plurality of communication terminals according to a plurality of communication protocols, to realize:

a pseudonymous identification information receiving unit which receives pseudonymous identification information which is information according to each of the communication protocols and is different from terminal identification information for identifying the communication terminal; and a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the received pseudonymous identification information, and transmits the communication information after replacement to a destination terminal which is another one of the communication terminals.

(Supplementary Note 27)

The computer program product according to Supplementary note 26, wherein the pseudonymous identification information receiving unit receives the source terminal identification information and the pseudonymous identification information associated with the source terminal identification information, and when the communication relay unit receives the communication information from the source terminal, the communication relay unit replaces the source terminal identification information included in the communication information with the pseudonymous identification information received in association with the source terminal identification information, and transmits the communication information after replacement to the destination terminal.

(Supplementary Note 28)

A communication relay system for relaying communications performed between a plurality of communication terminals according to a plurality of communication protocols, the system comprising:

at least one pseudonymous identification information acquiring means associated with each of the plurality of communication protocols, wherein the pseudonymous identification information acquiring means acquires pseudonymous identification information which is information according to the communication protocol associated with the pseudonymous identification information acquiring means and is different from terminal identification information for identifying each of the communication terminals; and communication relay means for, when receiving communication information according to at least one of the plurality of communication protocols from a source terminal which is one of the communication terminals, replacing source terminal identification information which is included in the communication information and is the terminal identification information for identifying the source terminal as the communication terminal serving as a source of the communication information, with the pseudonymous identification information acquired by the pseudonymous identification information acquiring unit, and transmitting the communication information after replacement to a destination terminal which is another one of the communication terminals.

(Supplementary Note 29)

A communication system comprising:

a plurality of communication terminals which perform communications according to a plurality of communication protocols; and a communication relay system for relaying the communications performed between the plurality of communication terminals, wherein a source terminal, which is one of the communication terminals, is adapted to transmit communication information which is communication information according to at least one of the communication protocols, and includes source terminal identification information which is terminal identification information for identifying the source terminal as one of the communication terminals serving as a source of the communication information, and destination terminal identification information which is terminal identification information for identifying a destination terminal as another one of the communication terminals serving as a destination of the communication information, and the communication relay system includes:

at least one pseudonymous identification information acquiring means associated with each of the plurality of communication protocols, wherein the pseudonymous identification information acquiring means acquires pseudonymous identification information which is information according to the communication protocol associated with the pseudonymous identification information acquiring means and is different from terminal identification information for identifying each of the communication terminals; and communication relay means for, when receiving the communication information from the source terminal, replacing source terminal identification information which is included in the communication information and is the terminal identification information for identifying the source terminal as the communication terminal serving as the source of the communication information, with the pseudonymous identification information acquired by the pseudonymous identification information acquiring means, and transmitting the communication information after replacement to the destination terminal.

(Supplementary Note 30)

A pseudonymous identification information acquiring device, comprising:

pseudonymous identification information acquiring means for acquiring pseudonymous identification information which is information according to a predetermined communication protocol and is different from terminal identification information for identifying a communication terminal.

(Supplementary Note 31)

A communication relay device adapted to relay communications performed between a plurality of communication terminals according to a plurality of communication protocols, the device comprising:

pseudonymous identification information receiving means for receiving pseudonymous identification information which is information according to each of the communication protocols and is information different from terminal identification information for identifying each of the communication terminals; and communication relay means for, when receiving communication information according to at least one of the plurality of communication protocols from a source terminal which is one of the communication terminals, replacing source terminal identification information which is included in the communication information and is the terminal identification information for identifying the source terminal as the communication terminal serving as a source of the communication information, with the received pseudonymous identification information, and transmitting the communication information after replacement to a destination terminal which is another one of the communication terminals.

The invention claimed is:

1. A communication relay system for relaying communications performed between a plurality of communication terminals according to a plurality of communication protocols, the system comprising:
   a plurality of pseudonymous identification information acquiring units associated with each of the plurality of communication protocols respectively, wherein each of the pseudonymous identification information acquiring units acquires pseudonymous identification information which is information according to the communication protocol associated with the pseudonymous identification information acquiring unit and is different from terminal identification information for identifying each of the communication terminals; and
   a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by each of the pseudonymous identification information acquiring units, and transmits the communication information after replacement to a destination terminal which is another one of the communication terminals.

2. The communication relay system according to claim 1, wherein
   each of the pseudonymous identification information acquiring units acquires the pseudonymous identification information in association with the source terminal identification information, and
   when the communication relay unit receives the communication information from the source terminal, the communication relay unit replaces the source terminal identification information included in the communication information with the pseudonymous identification information acquired by each of the pseudonymous identification information acquiring units in association with the source terminal identification information, and transmits the communication information after replacement to the destination terminal.

3. The communication relay system according to claim 1, further comprising:
   a mode information output unit which accepts mode information indicating a mode for generating the pseudonymous identification information, and outputs the accepted mode information to each of the pseudonymous identification information acquiring units.

4. A communication relay system for relaying communications performed between a plurality of communication terminals according to a plurality of communication protocols, the system comprising:
   at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals;
   a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by the pseudonymous identification information acquiring unit, and transmits the communication information after replacement to a destination terminal which is another one of the communication terminals; and
   a mode information output unit which accepts mode information indicating a mode for generating the pseudonymous identification information, and outputs the accepted mode information to each of the pseudonymous identification information acquiring units,
   wherein the mode information is information indicating either a first mode in which different pseudonymous identification information is generated each time a communication session is established, or a second mode in which pseudonymous identification information is generated only when a communication session is established for the first time.

5. The communication relay system according to claim 3, wherein
   each of the pseudonymous identification information acquiring units acquires pseudonymous identification information by generating the pseudonymous identification information according to the mode indicated by the mode information output from the mode information output unit.

6. The communication relay system according to claim 4, wherein
   the plurality of communication protocols include a first communication protocol, and a second communication protocol located on a physical layer side opposite to the first communication protocol in an OSI (Open Systems Interconnection) reference model,
   the plurality of pseudonymous identification information acquiring units include a first pseudonymous identification information acquiring unit associated with the first communication protocol, and a second pseudonymous identification information acquiring unit associated with the second communication protocol, and
   when the mode indicated by the mode information accepted by the mode information output unit is the second mode, the mode information output unit outputs mode information indicating the second mode to the first pseudonymous identification information acquiring unit, and also outputs mode information indicating the first mode to the second pseudonymous identification information acquiring unit.

7. A communication relay system for relaying communications performed between a plurality of communication terminals according to a plurality of communication protocols, the system comprising:
at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals;
a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by the pseudonymous identification information acquiring unit, and transmits the communication information after replacement to a destination terminal which is another one of the communication terminals; and
a mode information output unit which accepts mode information indicating a mode for generating the pseudonymous identification information, and outputs the accepted mode information to each of the pseudonymous identification information acquiring units,
wherein
the mode information output unit accepts the mode information and user identification information for identifying a user of the source terminal, and outputs the accepted mode information and the user identification information to each of the pseudonymous identification information acquiring units,
the pseudonymous identification information acquiring unit includes an identification information storing unit which stores user identification information for identifying a user and terminal identification information which is information according to a communication protocol associated with the pseudonymous identification information acquiring unit and for identifying the communication terminal, in association with each other, and
the pseudonymous identification information acquiring unit acquires the terminal identification information stored in association with the user identification information output from the mode information output unit, as the source terminal identification information.

8. The communication relay system according to claim 7, wherein
the mode information output unit accepts the mode information, source user identification information for identifying the user of the source terminal, and destination user identification information for identifying the user of the destination terminal, and outputs the mode information, the source user identification information, and the destination user identification information, which have been accepted, to each of the pseudonymous identification information acquiring units,
the pseudonymous identification information acquiring unit acquires terminal identification information stored in association with the source user identification information output from the mode information output unit as the source terminal identification information, and acquires terminal identification information stored in association with the destination user identification information output from the mode information output unit as the destination terminal identification information, and
when the communication relay unit receives the communication information including the source terminal identification information and the destination terminal identification information acquired by the pseudonymous identification information acquiring unit, the communication relay unit replaces the source terminal identification information included in the communication information with the pseudonymous identification information acquired in association with the source terminal identification information.

9. The communication relay system according to claim 8, wherein
the communication relay unit includes a pseudonymous identification information storing unit which stores the source terminal identification information and the pseudonymous identification information acquired in association with the source terminal identification information, in association with each other, and
if destination terminal identification information for identifying the communication terminal serving as a destination, included in the received communication information, conforms with the stored pseudonymous identification information, the communication relay unit replaces the destination terminal identification information with the source terminal identification information stored in association with the pseudonymous identification information, and transmits the communication information after replacement to the communication terminal identified by the source terminal identification information.

10. A communication relay system for relaying communications performed between a plurality of communication terminals according to a plurality of communication protocols, the system comprising:
at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals;
a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by the pseudonymous identification information acquiring unit, and transmits the communication information after replacement to a destination terminal which is another one of the communication terminals; and a mode information output unit which accepts mode information indicating a mode for generating the pseudonymous identification information, and outputs the accepted mode information to each of the pseudonymous identification information acquiring units, wherein the plurality of pseudonymous identification information acquiring units include a plurality of pseudonymous identification information acquiring units associated with the one of the plurality of communication protocols, the communication relay system further includes a load acquiring unit which acquires a load of each of the pseudonymous identification information acquiring units associated with one of the plurality of communication protocols, and the mode information output unit selects one of the plurality of pseudonymous identification information acquiring units associated with the one of the plurality of communication protocols based on the acquired loads, and outputs the accepted mode information to the selected pseudonymous identification information acquiring unit.

11. A communication relay system for relaying communications performed between a plurality of communication terminals according to a plurality of communication protocols, the system comprising:

at least one pseudonymous identification information acquiring unit associated with each of the plurality of communication protocols, wherein the pseudonymous identification information acquiring unit acquires pseudonymous identification information which is information according to the communication protocol associated with the pseudonymous identification information acquiring unit and is different from terminal identification information for identifying each of the communication terminals;

a communication relay unit which, when receiving communication information according to at least one of the plurality of communication protocols from a source terminal which is one of the communication terminals, replaces source terminal identification information which is included in the communication information and is the terminal identification information for identifying the source terminal as the communication terminal serving as a source of the communication information, with the pseudonymous identification information acquired by the pseudonymous identification information acquiring unit, and transmits the communication information after replacement to a destination terminal which is another one of the communication terminals; and a mode information output unit which accepts mode information indicating a mode for generating the pseudonymous identification information, and outputs the accepted mode information to each of the pseudonymous identification information acquiring units, wherein the plurality of pseudonymous identification information acquiring units include a plurality of pseudonymous identification information acquiring units associated with one of the communication protocols, and the mode information output unit selects one of the plurality of pseudonymous identification information acquiring units associated with the one of the plurality of communication protocols based on the mode indicated by the accepted mode information, and outputs the accepted mode information to the selected pseudonymous identification information acquiring unit.

12. The communication relay system according to claim 7, further comprising:

a terminal identification information change instruction accepting unit which, when the terminal identification information for identifying the communication has been changed, accepts a terminal identification information change instruction including user identification information for identifying the user of the communication terminal and the terminal identification information after the change; and an identification information updating unit which, when the terminal identification information change instruction has been accepted, updates the terminal identification information stored in the identification information storing unit in association with the user identification information included in the terminal identification information change instruction, to the terminal identification information after the change included in the terminal identification information change instruction, wherein when the terminal identification information change instruction is accepted, the pseudonymous identification information acquiring unit updates the source terminal identification information associated with the acquired pseudonymous identification information to the terminal identification information after the change included in the terminal identification information change instruction.

13. The communication relay system according to claim 1, wherein the plurality of communication protocols include SIP (Session Initiation Protocol) and IP (Internet Protocol).

14. A communication relay method applied to a communication relay system adapted to relay communications performed with a plurality of communication terminal according to a plurality of communications protocols, and including a plurality of pseudonymous identification information acquiring units associated with the plurality of communication protocols respectively, the method comprising:

acquiring, by each of the pseudonymous identification information acquiring units, pseudonymous identification information which is information according to the communication protocol associated with the pseudonymous identification information acquiring unit and is different from terminal identification information for identifying each of the communication terminals; and when receiving communication information according to at least one of the plurality of communication protocols from a source terminal which is one of the communication terminals, replacing source terminal identification information which is included in the communication information and is the terminal identification information for identifying the source terminal as the communication terminal serving as a source of the communication information with the pseudonymous identification information acquired by each of the pseudonymous identification information acquiring units, and transmitting the communication information after replacement to a destination terminal which is another one of the communication terminals.

15. The communication relay method according to claim 14, further comprising:

acquiring, by each of the pseudonymous identification information acquiring units, the pseudonymous identification information in association with the source terminal identification information; and when receiving the communication information from the source terminal, replacing the source terminal identification information included in the communication information with the pseudonymous identification information acquired by the pseudonymous identification information acquiring unit in association with the source terminal identification information, and transmitting the communication information after replacement to the destination terminal.

16. The communication relay method according to claim 14, further comprising:

accepting mode information indicating a mode for generating the pseudonymous identification information, and outputting the accepted mode information to each of the pseudonymous identification information acquiring units.

17. The communication relay system according to claim 3, wherein the mode information is information indicating either a first mode in which different pseudonymous identification information is generated each time a communication session is established, or a second mode in which pseudonymous identification information is generated only when a communication session is established for the first time.

18. The communication relay system according to claim 17, wherein the plurality of communication protocols include a first communication protocol, and a second communication protocol located on a physical layer side opposite to the first communication protocol in an OSI (Open Systems Interconnection) reference model, the plurality of pseudonymous identification information acquiring units include a first pseudonymous identification information acquiring unit associated with the first communication protocol, and a second pseudonymous identification information acquiring unit associated with the second communication protocol, and when the mode indicated by the mode information accepted by the mode information output unit is the second mode, the mode information output unit outputs mode information indicating the second mode to the first pseudonymous identification information acquiring unit, and also outputs mode information indicating the first mode to the second pseudonymous identification information acquiring unit.

19. The communication relay system according to claim 3, wherein the mode information output unit accepts the mode information and user identification information for identifying a user of the source terminal, and outputs the accepted mode information and the user identification information to each of the pseudonymous identification information acquiring units, each of the pseudonymous identification information acquiring units includes an identification information storing unit which stores user identification information for identifying a user and terminal identification information which is information according to a communication protocol associated with the pseudonymous identification information acquiring unit and for identifying the communication terminal, in association with each other, and each of the pseudonymous identification information acquiring units acquires the terminal identification information stored in association with the user identification information output from the mode information output unit, as the source terminal identification information.

20. The communication relay system according to claim 19, wherein the mode information output unit accepts the mode information, source user identification information for identifying the user of the source terminal, and destination user identification information for identifying the user of the destination terminal, and outputs the mode information, the source user identification information, and the destination user identification information, which have been accepted, to each of the pseudonymous identification information acquiring units, each of the pseudonymous identification information acquiring units acquires terminal identification information stored in association with the source user identification information output from the mode information output unit as the source terminal identification information, and acquires terminal identification information stored in association with the destination user identification information output from the mode information output unit as the destination terminal identification information, and when the communication relay unit receives the communication information including the source terminal identification information and the destination terminal identification information acquired by each of the pseudonymous identification information acquiring units, the communication relay unit replaces the source terminal identification information included in the communication information with the pseudonymous identification information acquired in association with the source terminal identification information.

21. The communication relay system according to claim 20, wherein the communication relay unit includes a pseudonymous identification information storing unit which stores the source terminal identification information and the pseudonymous identification information acquired in association with the source terminal identification information, in association with each other, and if destination terminal identification information for identifying the communication terminal serving as a destination, included in the received communication information, conforms with the stored pseudonymous identification information, the communication relay unit replaces the destination terminal identification information with the source terminal identification information stored in association with the pseudonymous identification information, and transmits the communication information after replacement to the communication terminal identified by the source terminal identification information.

22. The communication relay system according to claim 3, wherein the plurality of pseudonymous identification information acquiring units include a plurality of pseudonymous identification information acquiring units associated with the one of the plurality of communication protocols, the communication relay system further includes a load acquiring unit which acquires a load of each of the pseudonymous identification information acquiring units associated with one of the plurality of communication protocols, and the mode information output unit selects one of the plurality of pseudonymous identification information acquiring units associated with the one of the plurality of communication protocols based on the acquired loads, and outputs the accepted mode information to the selected pseudonymous identification information acquiring unit.

23. The communication relay system according to claim 3, wherein the plurality of pseudonymous identification information acquiring units include a plurality of pseudonymous identification information acquiring units associated with one of the communication protocols, and the mode information output unit selects one of the plurality of pseudonymous identification information acquiring units associated with the one of the plurality of communication protocols based on the mode indicated by the accepted mode information, and outputs the accepted mode information to the selected pseudonymous identification information acquiring unit.

24. The communication relay system according to claim 19, further comprising:

a terminal identification information change instruction accepting unit which, when the terminal identification information for identifying the communication has been changed, accepts a terminal identification information change instruction including user identification information for identifying the user of the communication terminal and the terminal identification information after the change; and an identification information updating unit which, when the terminal identification information change instruction has been accepted, updates the terminal identification information stored in the identification information storing unit in association with the user identification information included in the terminal identification information change instruction, to the terminal identification information after the change included in the terminal identification information change instruction, wherein when the terminal identification information change instruction is accepted, each of the pseudonymous identification information acquiring units updates the source terminal identification information associated with the acquired pseudonymous identification information to the terminal identification information after the change included in the terminal identification information change instruction.

* * * * *